US012777252B2

(12) United States Patent
Rho et al.

(10) Patent No.: US 12,777,252 B2
(45) Date of Patent: Oct. 27, 2026

(54) CAMERA MODULE AND ELECTRONIC DEVICE COMPRISING SAME

(71) Applicant: SAMSUNG ELECTRONICS CO., LTD., Suwon-si (KR)

(72) Inventors: Hyungjin Rho, Suwon-si (KR); Bongchan Kim, Suwon-si (KR); Jaeheung Park, Suwon-si (KR); Kwangseok Byon, Suwon-si (KR); Hyosang An, Suwon-si (KR); Jonghun Won, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/605,219

(22) Filed: Mar. 14, 2024

(65) Prior Publication Data

US 2024/0223900 A1 Jul. 4, 2024

Related U.S. Application Data

(63) Continuation of application No. PCT/KR2022/013699, filed on Sep. 14, 2022.

(30) Foreign Application Priority Data

Sep. 14, 2021 (KR) ........................ 10-2021-0122549
Apr. 5, 2022 (KR) ........................ 10-2022-0042500

(51) Int. Cl.
*H04N 23/68* (2023.01)
*H01F 7/08* (2006.01)
(Continued)

(52) U.S. Cl.
CPC ........... *H04N 23/687* (2023.01); *H01F 7/081* (2013.01); *H01F 7/123* (2013.01); *H04N 23/51* (2023.01); *H04N 23/54* (2023.01)

(58) Field of Classification Search
CPC ...... H04N 23/687; H04N 23/51; H04N 23/54; H04N 23/55; H04N 23/57; H01F 7/081;
(Continued)

(56) References Cited

U.S. PATENT DOCUMENTS 10,921,552 B1 2/2021 Park et al.
2007/0257989 A1 11/2007 Shirono
(Continued)

FOREIGN PATENT DOCUMENTS

CN 113302910 A 8/2021
JP 2020-101753 A 7/2020
(Continued)

OTHER PUBLICATIONS

Communication dated Feb. 21, 2025, issued by the European Patent Office in European Application No. 22870258.5.
(Continued)

*Primary Examiner* — Padma Haliyur
(74) *Attorney, Agent, or Firm* — Sughrue Mion, PLLC

(57) ABSTRACT

A camera module includes: a camera housing; at least one lens aligned along an optical axis; a first printed circuit board (PCB) including an image sensor disposed on a surface of the first PCB; a carrier member configured to guide the first PCB in a first direction parallel to the optical axis and a second direction crossing the optical axis; and a driving member including: at least one coil; at least one magnet at least partially facing the at least one coil; and a plurality of guide balls, wherein the driving member is configured to move the carrier member in the first direction and the second direction based on rotations of the plurality of guide balls.

20 Claims, 19 Drawing Sheets

(51) Int. Cl.

| | |
|---|---|
| ***H01F 7/123*** | (2006.01) |
| ***H04N 23/51*** | (2023.01) |
| ***H04N 23/54*** | (2023.01) |

(58) Field of Classification Search

CPC ............ H01F 7/123; G03B 2205/0038; G03B 2205/0069; G03B 5/08; G03B 30/00; H02K 41/0356; H02K 7/08; H02K 2211/03

See application file for complete search history.

(56) References Cited

U.S. PATENT DOCUMENTS

| | | | | |
|---|---|---|---|---|
| 2019/0020822 | A1 | 1/2019 | Sharma et al. | |
| 2020/0225443 | A1 | 7/2020 | Lim et al. | |
| 2021/0072495 | A1* | 3/2021 | Shin | G02B 13/009 |
| 2021/0080807 | A1 | 3/2021 | Sharma | |
| 2021/0208417 | A1 | 7/2021 | Choi et al. | |
| 2021/0218896 | A1 | 7/2021 | Smyth et al. | |
| 2021/0284081 | A1* | 9/2021 | Garcia | H04N 23/57 |
| 2022/0086317 | A1 | 3/2022 | Paik et al. | |
| 2022/0091397 | A1* | 3/2022 | Brodie | G02B 13/0065 |
| 2023/0023813 | A1 | 1/2023 | Oh | |

FOREIGN PATENT DOCUMENTS

| | | | |
|---|---|---|---|
| KR | 10-2007-0107566 | A | 11/2007 |
| KR | 10-2013-0092914 | A | 8/2013 |
| KR | 10-1792328 | B1 | 11/2017 |
| KR | 10-2019-0132126 | A | 11/2019 |
| KR | 10-2090625 | B1 | 3/2020 |
| KR | 10-2146385 | B1 | 8/2020 |
| KR | 10-2021-0044871 | A | 4/2021 |
| KR | 10-2021-0059681 | A | 5/2021 |
| KR | 10-2021-0081556 | A | 7/2021 |
| KR | 10-2021-0083154 | A | 7/2021 |
| WO | 2020/069391 | A1 | 4/2020 |

OTHER PUBLICATIONS

International Search Report (PCT/ISA/210) issued Dec. 22, 2022 by the International Searching Authority in International Application No. PCT/KR2022/013699.

Written Opinion (PCT/ISA/237) issued Dec. 22, 2022 by the International Searching Authority in International Application No. PCT/KR2022/013699.

* cited by examiner

CAMERA MODULE AND ELECTRONIC DEVICE COMPRISING SAME

CROSS-REFERENCE TO RELATED APPLICATION(S)

This application is a by-pass continuation application of International Application No. PCT/KR2022/013699, filed on Sep. 14, 2022, which is based on and claims priority to Korean Patent Application No. 10-2021-0122549, filed on Sep. 14, 2021, and Korean Patent Application No. 10-2022-0042500, filed on Apr. 5, 2022, in the Korean Intellectual Property Office, the disclosures of which are incorporated by reference herein in their entireties.

BACKGROUND

1. Field

The disclosure relates to a camera module and an electronic device including the same.

2. Description of Related Art

With the development of digital camera manufacturing technology, an electronic device equipped with a compact and lightweight camera module has been used. Users may take advantage of various functionalities of an electronic device with camera modules, such as photographing, video recording, video call, augmented reality (AR), etc., in a convenient manner, while carrying it all the time. Typically, a camera module may include a lens assembly and an image sensor.

The camera module may perform an optical image stabilization function for image correction in response to disturbance. Here, the disturbance may be the occurrence of various artifacts, such as blurring of the image obtained through the camera module due to slight shaking of the user's hand when taking a photo or video. The optical image stabilization function, e.g., a shake (or hand shake) correction function, may move the lens assembly included in the camera module on a plane perpendicular to the optical axis to compensate for limited movement of the electronic device due to the user's grip or the fixing device, thereby preventing or alleviating shakes in the captured image or video. To that end, the camera module may include at least one coil and magnet. The coil to which current is applied may generate electromagnetic force through electromagnetic interaction with the magnet, and the camera module may perform a shake correction function using the generated electromagnetic force. As a method for correcting shakes by electromagnetic force, various methods, such as a lens shift that moves the lens assembly, a prism shift that moves the prism, and a module tilt that tilts the camera module, may apply.

The lens shift method may be a method for implementing optical image stabilization by moving the entire lens assembly. When a small optical system (wide-angle single-focus, small diameter) is used, it may be easy to perform optical image stabilization by moving the entire lens assembly. However, according to the recent trend of applying large-diameter lenses (bright lenses) and large sensors, the lens increases in weight and volume, and so does the device for performing optical image stabilization. It may be very hard to mount a large-scale camera module in an electronic device. Further, the current consumption required for driving the camera module may increase.

According to the prism shift method, unlike the lens shift method, a method of moving the entire lens assembly may be difficult to apply to telescopic short-focus lenses or zoom lenses whose optical overall length may increase, and thus a method of moving some lens groups may be applied instead. However, the method of moving some lens groups may be subject to limitations to optical design and deterioration (e.g., aberrations) of optical performance, because the relative positions between lenses are not fixed at one position for optical image stabilization. According to the prism shift method, the movement of a lens may be visible at the exterior of the electronic device.

The module tilt method is known to be capable of achieving optical image stabilization without loss of the field-of-view but, due to the need for adding an actuator for tilting, it may be subject to increases in overall camera module size, costs, and current consumption.

SUMMARY

Provided are an electronic device performing optical image stabilization in an image sensor shift method.

According to an aspect of the disclosure, a camera module includes: a camera housing; at least one lens aligned along an optical axis; a first printed circuit board (PCB) including an image sensor disposed on a surface of the first PCB; a carrier member configured to guide the first PCB in a first direction parallel to the optical axis and a second direction crossing the optical axis; and a driving member including: at least one coil; at least one magnet at least partially facing the at least one coil; and a plurality of guide balls, wherein the driving member is configured to move the carrier member in the first direction and the second direction based on rotations of the plurality of guide balls.

The carrier member may include: a first carrier coupled with the first PCB, the first carrier including: a first opening at a position overlapping the image sensor, a first plate at least partially surrounding the first opening, and a first protruding guide portion protruding from the first plate in the first direction and including a second opening for receiving a coil; a second carrier on the first carrier, the second carrier including a third opening at a position overlapping the image sensor, a second plate at least partially surrounding the third opening, and a second protruding guide portion protruding from the second plate in the first direction and including a fourth opening for receiving the first protruding guide portion; and a third carrier on the second carrier.

The driving member may further include a first driver, and the first driver may include a first coil received in the second opening of the first protruding guide portion, and a first magnet at a position in the second protruding guide portion corresponding to the first and facing the first coil.

The first driver may be configured to auto-focus the camera module.

The camera module may further include a first guide ball positioned between an outer surface of the first protruding guide portion and an inner surface of the second protruding guide portion when the first protruding guide portion is received in the second protruding guide portion, and the first driver may be configured to reciprocate the first carrier in the first direction based on a rotation of the first guide ball.

A first recess where the first guide ball is seated may be formed in the outer surface of the first protruding guide portion, and a second recess where the first guide ball is seated may be formed in the inner surface of the second protruding guide portion facing the outer surface of the first protruding guide portion.

The driving member may include: a second driver including a second coil on a cover member of the camera housing and a second magnet at a position on a surface of the second carrier corresponding to the second coil and facing the second coil; and a third driver including a third coil fixedly disposed on the cover member of the camera housing and a third magnet at a position on the surface of the second carrier corresponding to the third coil and facing the third coil.

Each of the second driver and the third driver may be configured for optical image stabilization of the camera module.

The camera module may further include: a second guide ball between the second carrier and the third carrier; and a third guide ball between the third carrier and the cover member of the camera housing, and each of the second driver and the third driver is configured to reciprocate the first carrier in the second direction crossing the optical axis based on rotations of the second guide ball and the third guide ball.

A third recess where the second guide ball is seated may be formed in a surface of the second carrier facing the third carrier.

A fourth recess where the second guide ball is seated may be formed in a surface of the third carrier facing the second carrier, and a fifth recess where the third guide ball is seated may be formed in a surface of the third carrier facing the cover member of the camera housing.

The camera module may further include: a second PCB; at least one connector on the second PCB; and a first flexible PCT (FPCB) electrically connecting the first PCB is electrically connected to the second PCB, and the first FPCB may include: a first end portion coupled to the first PCB; a second end portion coupled to the second PCB; and an extension extending from the first end portion and connected to the second end portion.

The camera module may further include a second FPCB on the cover member of the camera housing, and the second coil and the third coil may be electrically connected to the second FPCB.

The carrier member may include: a first carrier coupled with the first PCB, the first carrier including: a first plate including a first opening formed at a position overlapping the image sensor and a second opening formed adjacent to the first opening and configured to receive a coil, and a first protruding guide portion protruding from the first plate in the first direction parallel to the optical axis; a second carrier on the first carrier, the second carrier including: a third opening formed at a position overlapping the image sensor, a second plate at least partially surrounding the third opening, and a second protruding guide portion protruding from the second plate in the first direction and including a fourth opening for receiving the first protruding guide portion; and a third carrier on the second carrier.

The optical axis may include a first optical axis and a second optical axis facing a third direction crossing the first optical axis, and the camera module may further include a member at least partially received in the camera housing and configured to refract or reflect the first optical axis to the second optical axis or the second optical axis to the first optical axis.

According to an aspect of the disclosure, an electronic device includes: a camera module including: a camera housing; at least one lens aligned along an optical axis; and an image sensor configured to form light transmitted through the at least one lens to output as a digital signal; an auto-focusing driver configured to move the image sensor in a first direction parallel to the optical axis based on ball bearing rotations; and an optical image stabilization driver configured to move the image sensor in at least one second direction crossing the optical axis based on the ball bearing rotations.

According to an aspect of the disclosure, and electronic device including: a camera module; a housing; at least one optical member aligned along an optical axis; a first printed circuit board (PCB) including an image sensor disposed on a surface of the first PCB; a carrier member configured to guide the first PCB in a first direction parallel to the optical axis and a second direction crossing the optical axis; and a driving member including: at least one coil; at least one magnet at least partially facing the at least one coil; and a plurality of guide balls, wherein the electronic device is configured to move the carrier member in the first direction and the one second direction based on rotations of the plurality of guide balls.

According to an embodiment, optical image stabilization is performed using an image sensor which is a relatively small, lightweight component among various components of a camera module. Thus, it is possible to downsize an actuator and enhance OIS performance unlike the lens shift method, prism shift method, or module tilt method. It is also possible to prevent factors that deteriorate optical performance, such as aberrations by moving the image sensor itself, where an image of light forms, rather than moving some lenses of the optical system.

Other various effects may be provided directly or indirectly in the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description taken in conjunction with the accompanying drawings may be presented to provide a comprehensive understanding of various implementations of the disclosure as defined by the claims and equivalents thereto. The specific embodiments disclosed in the following description entail various specific details to aid understanding, but are regarded as one of various embodiments. Accordingly, it will be apparent to those skilled in the art that various changes and modifications may be made to the various implementations described in the disclosure without departing from the scope and spirit of the disclosure. Further, descriptions of well-known functions and configurations may be omitted for clarity and brevity.

The terms and words used in the following description and claims are not limited to the bibliographical meaning, but may be used to clearly and consistently describe the various embodiments of the disclosure. Therefore, it will be apparent to those skilled in the art that the following description of various implementations of the disclosure is provided only for the purpose of description, not for the purpose of limiting the disclosure defined as the scope of the claims and equivalent thereto.

The singular forms “a,” “an,” and “the” are intended to include the plural forms as well, unless the context clearly indicates otherwise. Thus, as an example, “a component surface” may be interpreted as including one or more of the surfaces of a component.

Figure 1:
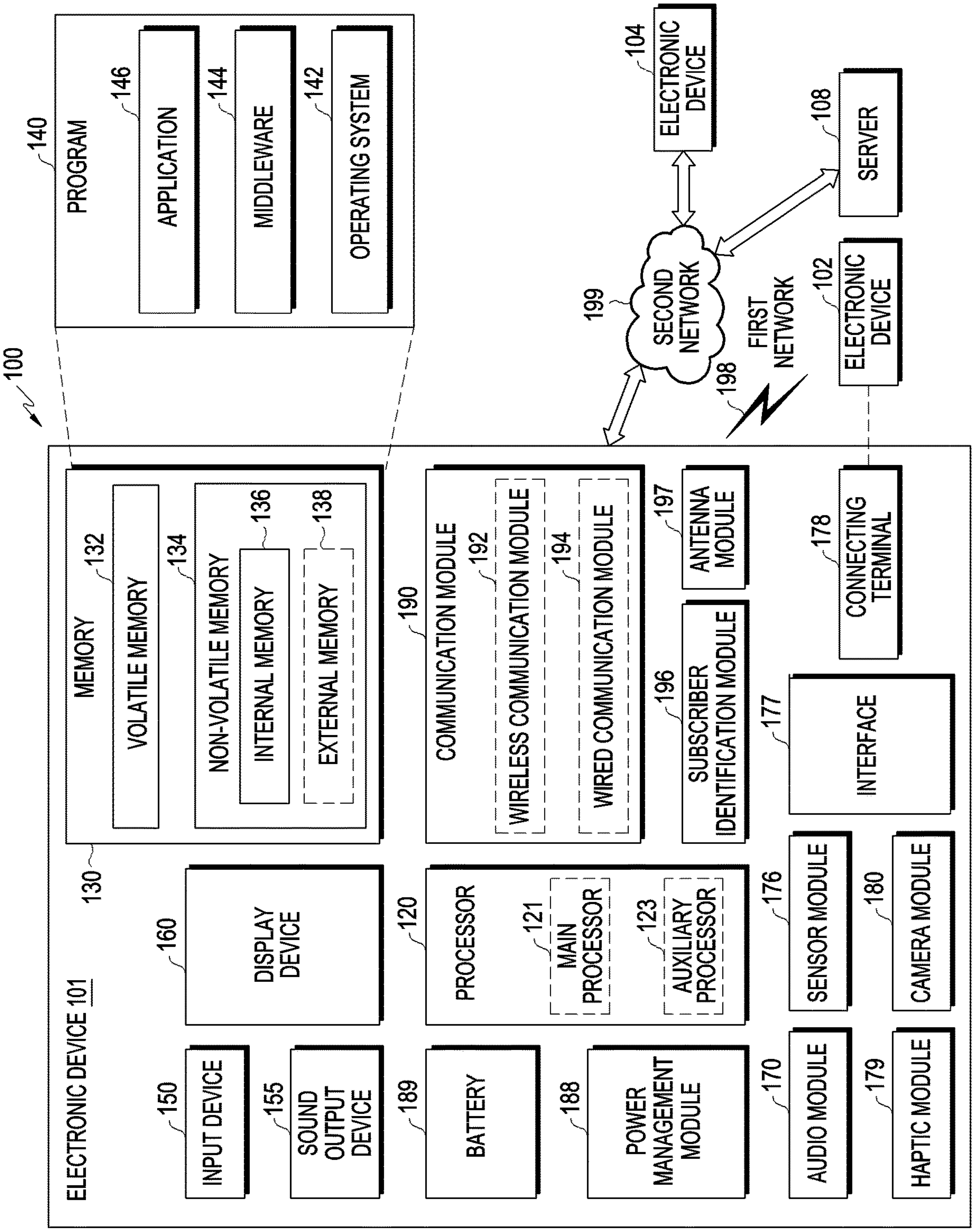
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module corresponding to the user’s left eye and/or a second display module corresponding to the user’s right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
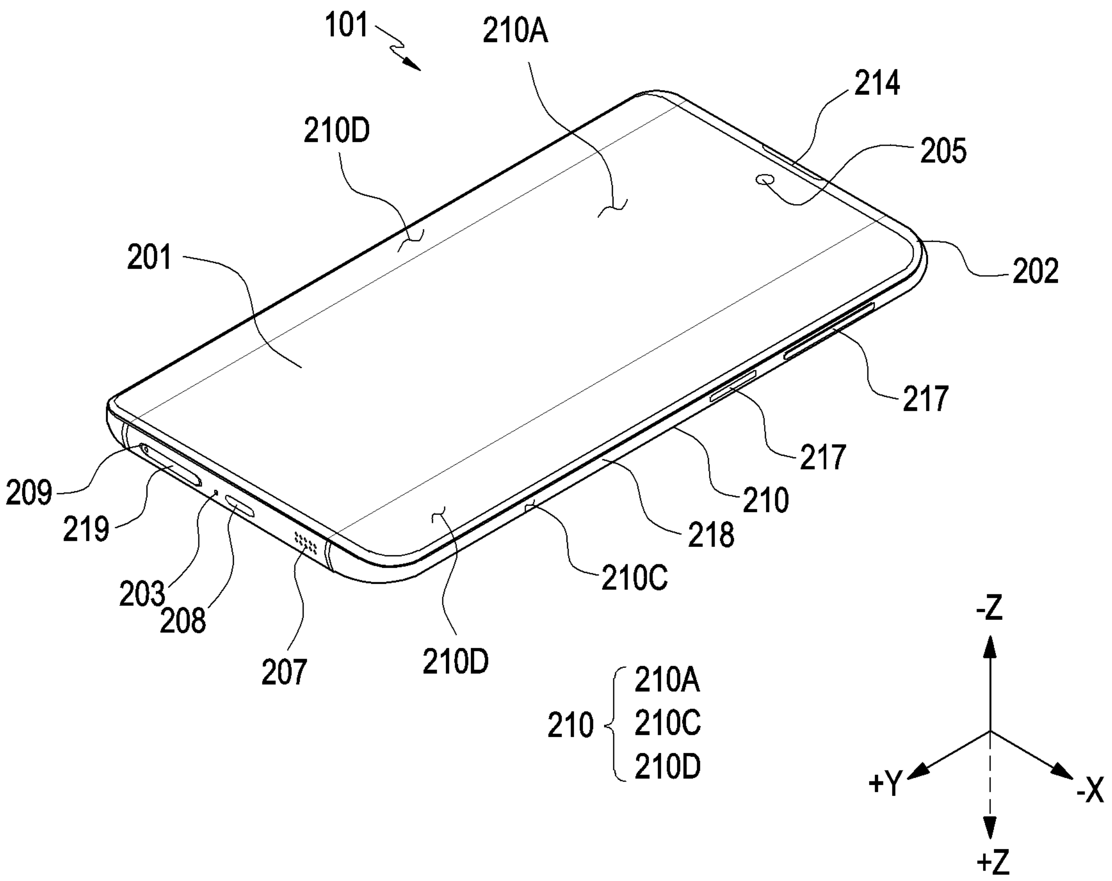
FIG. 2 is a front perspective view illustrating an electronic device according to an embodiment.
Figure 3:
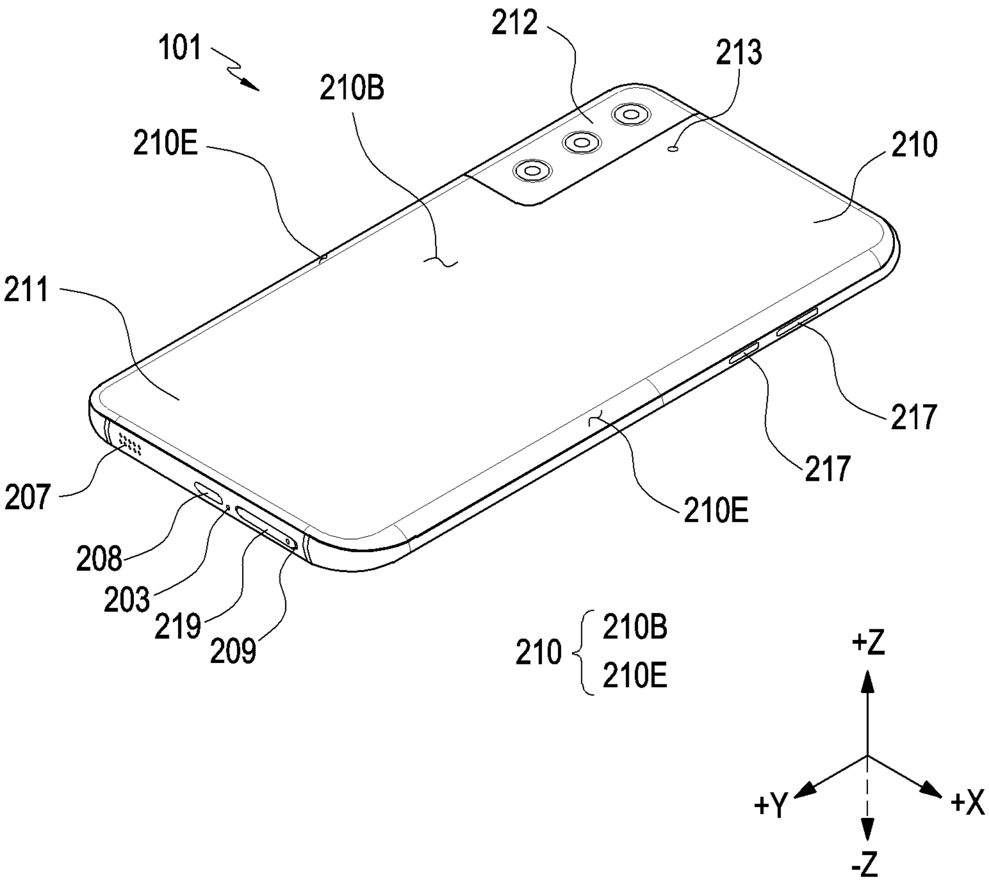
FIG. 3 is a rear perspective view illustrating an electronic device according to an embodiment.

FIG. 2 is a front perspective view illustrating an electronic device 101 according to an embodiment. FIG. 3 is a rear perspective view illustrating an electronic device 101 according to an embodiment.

In the following detailed description, the length direction of the electronic device 101 may be defined as the 'Y-axis direction', the width direction as the 'X-axis direction', and/or the height direction (the thickness direction) as the 'Z-axis direction'. In the following detailed description, the mentioned length direction, width direction, and/or height direction (or thickness direction) may indicate the length direction, the width direction, and/or the height direction (or thickness direction) of the electronic device. In an embodiment, 'negative/positive (−/+)' may be mentioned together with the Cartesian coordinate system exemplified in the drawings with respect to the direction in which the component is oriented. For example, referring to FIG. 2, the front surface of the electronic device 101 or housing 210 may be defined as a 'surface facing in the −Z direction (or first direction),' and the rear surface may be defined as a 'surface facing in the +Z direction (or second direction)'. In describing the direction, when 'negative/positive (−/+)' is not described, it may be interpreted as including both the + direction and the − direction unless separately defined. For example, the 'Z-axis direction' may be interpreted as including both the +Z direction and the −Z direction. Likewise, 'X-axis direction' may be interpreted as including both +X direction and −X direction, and 'Y-axis direction' may be interpreted as including both +Y direction and −Y direction. In describing directions, facing in any one axis among the three axes of the orthogonal coordinate system may include facing in a direction parallel to the axis. It should be noted that the directions are so defined with respect to the Cartesian coordinate system shown in the drawings for the sake of brevity of description, and the description of these directions or components do not limit an embodiment.

Referring to FIGS. 2 and 3, according to an embodiment, an electronic device 101 may include a housing 210 with a front surface 210A, a rear surface 210B, and a side surface 210C surrounding a space between the front surface 210A and the rear surface 210B. According to an embodiment, the housing 210 may denote a structure forming part of the front surface 210A, the rear surface 210B, and the side surface 210C of FIG. 2. According to an embodiment, at least part of the front surface 210A may have a substantially transparent front plate 202 (e.g., a glass plate or polymer plate including various coating layers). The rear surface 210B may be formed by a rear plate 211. The rear plate 211 may be formed of, e.g., glass, ceramic, polymer, metal (e.g., aluminum, stainless steel (STS), or magnesium), or a combination of at least two thereof. The side surface 210C may be formed by a side bezel structure (or a "side member") 218 that couples to the front plate 202 and the rear plate 211 and includes a metal and/or polymer. According to an embodiment, the rear plate 211 and the side bezel plate 218 may be integrally formed together and include the same material (e.g., glass, metal, such as aluminum, or ceramic).

In the embodiment illustrated, the front plate 202 may include two first edge areas 210D, which seamlessly and bendingly extend from the first surface 210A to the rear plate 211, on both the long edges of the front plate 202. In the embodiment (refer to FIG. 3) illustrated, the rear plate 211 may include two second edge areas 210E, which seamlessly and bendingly extend from the rear surface 210B to the front plate 202, on both the long edges. According to an embodiment, the front plate 202 (or the rear plate 211) may include only one of the first edge areas 210D (or the second edge areas 210E). According to an embodiment, the first edge areas 210D or the second edge areas 210E may partially be excluded. According to an embodiment, at side view of the electronic device 101, the side bezel structure 218 may have a first thickness (or width) for sides that do not have the first edge areas 210D or the second edge areas 210E and a second thickness, which is smaller than the first thickness, for sides that have the first edge areas 210D or the second edge areas 210E.

According to an embodiment, the electronic device 101 may include at least one of a display 201, audio modules 203, 207, and 214 (e.g., the audio module 170 of FIG. 1), a sensor module (e.g., the sensor module of FIG. 1). 176), camera modules 205, 212, and 213 (e.g., the camera module 180 of FIG. 1), a key input device 217 (e.g., the input module 150 of FIG. 1), a connector hole 208 (e.g., the connecting terminal 178 of FIG. 1), and a tray hole 209. In some embodiments, the electronic device 101 may exclude at least one of the components or may add another component.

According to an embodiment, the display 201 may be visually revealed through, e.g., a majority portion of the front plate 202. According to an embodiment, at least a portion of the display 201 may be visually exposed through the front plate 202 forming the front surface 210A and the first edge areas 210D. According to an embodiment, the edge of the display 201 may be formed to be substantially the same in shape as an adjacent outer edge of the front plate 202. According to an embodiment, the interval between the outer edge of the display 201 and the outer edge of the front plate 202 may remain substantially even to give a larger area of exposure the display 201.

According to an embodiment, the surface (or the front plate 202) of the housing 210 may include a screen display area formed as the display 201 is visually exposed. For example, the screen display area may include the front surface 210A and first edge areas 210D.

In an embodiment, a recess or opening may be formed in a portion of the screen display area (e.g., the front surface 210A or the first edge area 210D) of the display 201, and at least one or more of the audio module 214, sensor module, light emitting device, and camera module 205 may be aligned with the recess or opening. According to an embodiment, at least one or more of the audio module 214, sensor module, camera module 205, fingerprint sensor, and light emitting device may be included on the rear surface of the screen display area of the display 201.

According to an embodiment, the display 201 may be disposed to be coupled with, or adjacent, a touch detecting circuit, a pressure sensor capable of measuring the strength (pressure) of touches, and/or a digitizer for detecting a magnetic field-type stylus pen.

According to an embodiment, at least part of the key input device 217 may be disposed in the first edge areas 210D and/or the second edge areas 210E.

According to an embodiment, the audio modules 203, 207, and 214 may include, e.g., a microphone hole 203 and speaker holes 207 and 214. A microphone for acquiring external sounds may be disposed in the microphone hole 203. In some embodiments, a plurality of microphones may be disposed to detect the direction of the sound. The speaker holes 207 and 214 may include an external speaker hole 207 and a phone receiver hole 214. In an embodiment, the speaker holes 207 and 214 and the microphone hole 203 may be implemented as a single hole, or speakers may be included without the speaker holes 207 and 214 (e.g., piezo speakers). The audio modules 203, 207, and 214 are not limited to the above-described structure. Depending on the structure of the electronic device 101, various design changes may be made—e.g., only some of the audio modules may be mounted, or a new audio module may be added.

According to an embodiment, the sensor modules may generate an electrical signal or data value corresponding to an internal operating state or external environmental state of the electronic device 101. The sensor modules may include a first sensor module (e.g., a proximity sensor) and/or a second sensor module (e.g., a fingerprint sensor) disposed on the front surface 210A of the housing 210 and/or a third sensor module (e.g., an HRM sensor) and/or a fourth sensor module (e.g., a fingerprint sensor) disposed on the rear surface 210B of the housing 210. In an embodiment, the fingerprint sensor may be disposed on the rear surface 210B as well as on the front surface 210A (e.g., the display 201) of the housing 210. The electronic device 101 may further include sensor modules, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor. The sensor module is not limited to the above-described structure. Depending on the structure of the electronic device 101, various design changes may be made—e.g., only some of the sensor modules may be mounted, or a new sensor module may be added.

According to an embodiment, the camera modules 205, 212, and 213 may include a first camera module 205 disposed on the first surface 210A of the electronic device 101, and a rear camera device 212 and/or a flash 213 disposed on the rear surface 210B. The camera modules 205 and 212 may include one or more lenses, an image sensor, and/or an image signal processor. The flash 213 may include, e.g., a light emitting diode (LED) or a xenon lamp. In an embodiment, two or more lenses (an infrared (IR) camera, a wide-angle lens, and a telephoto lens) and image sensors may be disposed on one surface of the electronic device 101. The camera modules 205, 212, and 213 are not limited to the above-described structure. Depending on the structure of the electronic device 101, various design changes may be made—e.g., only some of the camera modules may be mounted, or a new camera module may be added.

According to an embodiment, the electronic device 101 may include a plurality of camera modules (e.g., a dual camera or triple camera) having different attributes (e.g., angle of view) or functions. For example, a plurality of camera modules 205 and 212 including lenses having different angles of view may be configured, and the electronic device 101 may control to change the angle of view of the camera modules 205 and 212 performed by the electronic device 101 based on the user's selection. At least one of the plurality of camera modules 205 and 212 may form, for example, a wide-angle camera and at least another of the plurality of camera modules may form a telephoto camera. Similarly, at least one (e.g., 205) of the plurality of camera modules 205 and 212 may be a front camera and at least another (e.g., 212) of the plurality of camera modules may be a rear camera. Further, the plurality of camera modules 205 and 212 may include at least one of a wide-angle camera, a telephoto camera, and an infrared (IR) camera (e.g., a time of flight (TOF) camera, a structured light camera). According to an embodiment, the IR camera may be operated as at least a portion of the sensor module. For example, the TOF camera may be operated as at least a portion of a sensor module for detecting the distance to the subject. According to an embodiment, a portion (e.g., front camera module 205) of the plurality of camera modules 205 and 212 may be implemented as an under display camera (UDC).

According to an embodiment, the key input device 217 may be disposed on the side surface 210C of the housing 210. According to an embodiment, the electronic device 101 may exclude all or some of the above-mentioned key input devices 217 and the excluded key input devices 217 may be implemented in other forms, e.g., as soft keys, on the display 201. According to an embodiment, the key input device may include the sensor module disposed on the rear surface 210B of the housing 210.

According to an embodiment, the light emitting device may be disposed on, e.g., the front surface 210A of the housing 210. The light emitting device may provide, e.g., information about the state of the electronic device 101 in the form of light. According to an embodiment, the light emitting device may provide a light source that interacts with, e.g., the front camera module 205. The light emitting device may include, e.g., a light emitting diode (LED), an infrared (IR) LED, and/or a xenon lamp.

According to an embodiment, the connector hole 208 may include a first connector hole 208 for receiving a connector (e.g., a universal serial bus (USB) connector) for transmitting or receiving power and/or data to/from an external electronic device and may further include a second connector hole (e.g., an earphone jack) for receiving a connector for transmitting or receiving audio signals to/from the external electronic device. The connector hole 208 is not limited to the above-described structure. Depending on the structure of the electronic device 101, various design changes may be made, such as mounting only some of the connector holes or adding a new connector hole.

According to an embodiment, the tray hole 209 may be a component for receiving, e.g., a tray 219 for mounting a storage medium. Here, the storage medium that may be mounted in the tray hole 209 may include at least one of a user identification module card (subscriber identification module (SIM) card) and a secure digital (SD) card. The tray hole 209 is illustrated as formed in the bottom surface of the housing 210 in FIGS. 2 and 3, but alternatively, it may be formed in a side or top surface of the housing 210, and its position may vary depending on the purpose and function of the electronic device 101 and various design form factors.

According to an embodiment, the camera module 205 and/or the sensor module may be disposed to contact the external environment through a designated area of the display 201 and the front plate 202 from the internal space of the electronic device 101. For example, the designated area may be an area in which pixels are not disposed in the display 201. As another example, the designated area may be an area in which pixels are disposed in the display 201. When viewed from above the display 201, at least a portion of the designated area may overlap the camera module 205 and/or the sensor module. As another example, some sensor modules may be arranged to perform their functions without being visually exposed through the front plate 202 from the internal space of the electronic device.

The electronic device 101 illustrated in FIGS. 2 and 3 has a bar-type or plate-type appearance but the disclosure is not limited thereto. For example, the illustrated electronic device may be part of a rollable electronic device or a foldable electronic device. "Rollable electronic device" may mean an electronic device at least a portion of which may be wound or rolled or received in the housing 210 as the display may be bent and deformed. As the display is stretched out or is exposed to the outside in a larger area according to the user's need, the rollable electronic device may use an expanded second display area. "Foldable electronic device" may mean an electronic device that may be folded in directions to face two different areas of the display or in directions opposite to each other. In the portable state, the foldable electronic device may be folded so that the two different areas of the display face each other and, in an actual use state, the user may unfold the display so that the two different areas form a substantially flat shape. In some embodiments, the electronic device 101 according to an embodiment may be interpreted as including various electronic devices, such as a laptop computer or a home appliance, as well as a portable electronic device, such as a smart phone.

Figure 4:
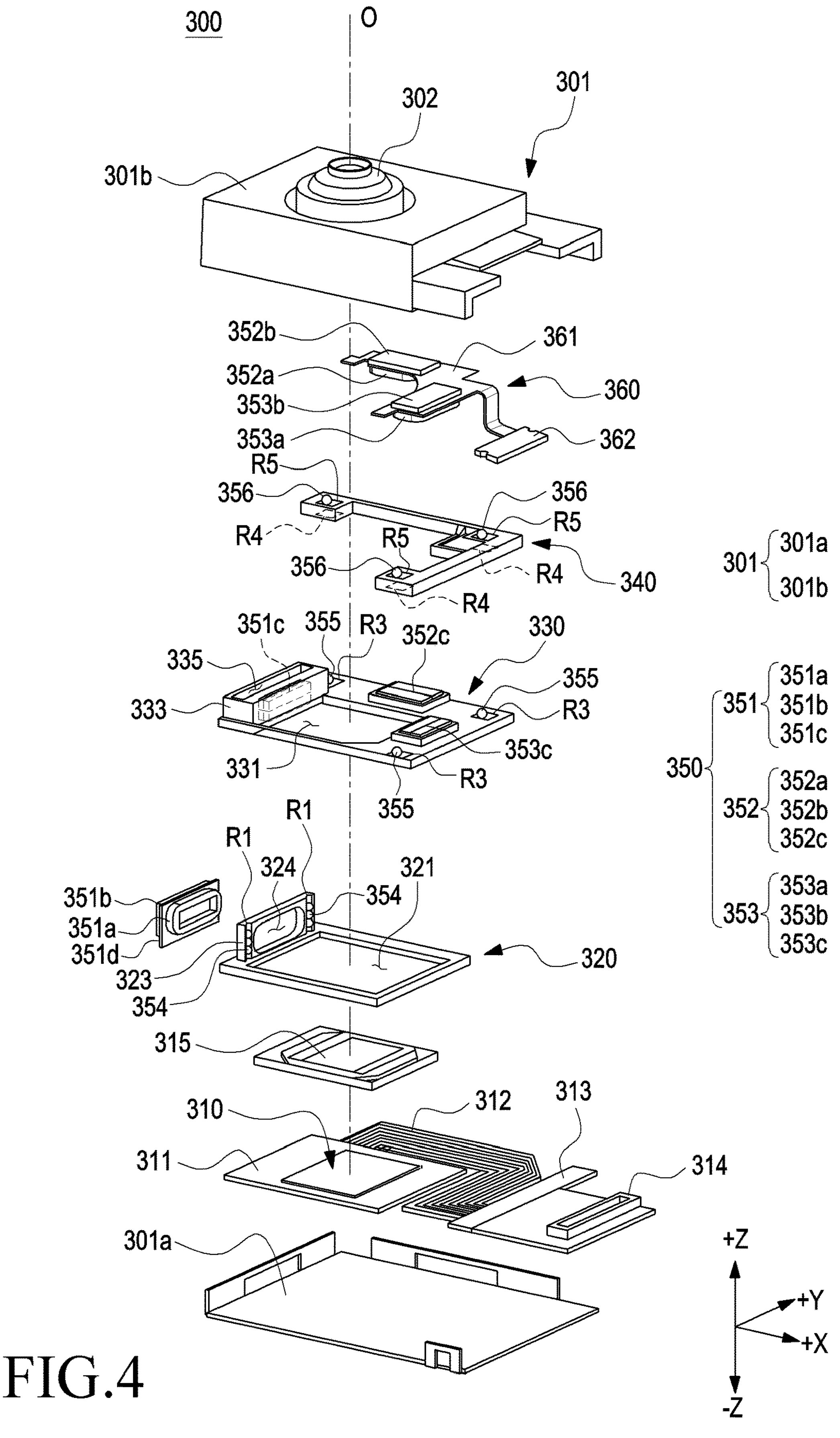
FIG. 4 is an exploded perspective view illustrating a camera module according to an embodiment.
Figure 5:
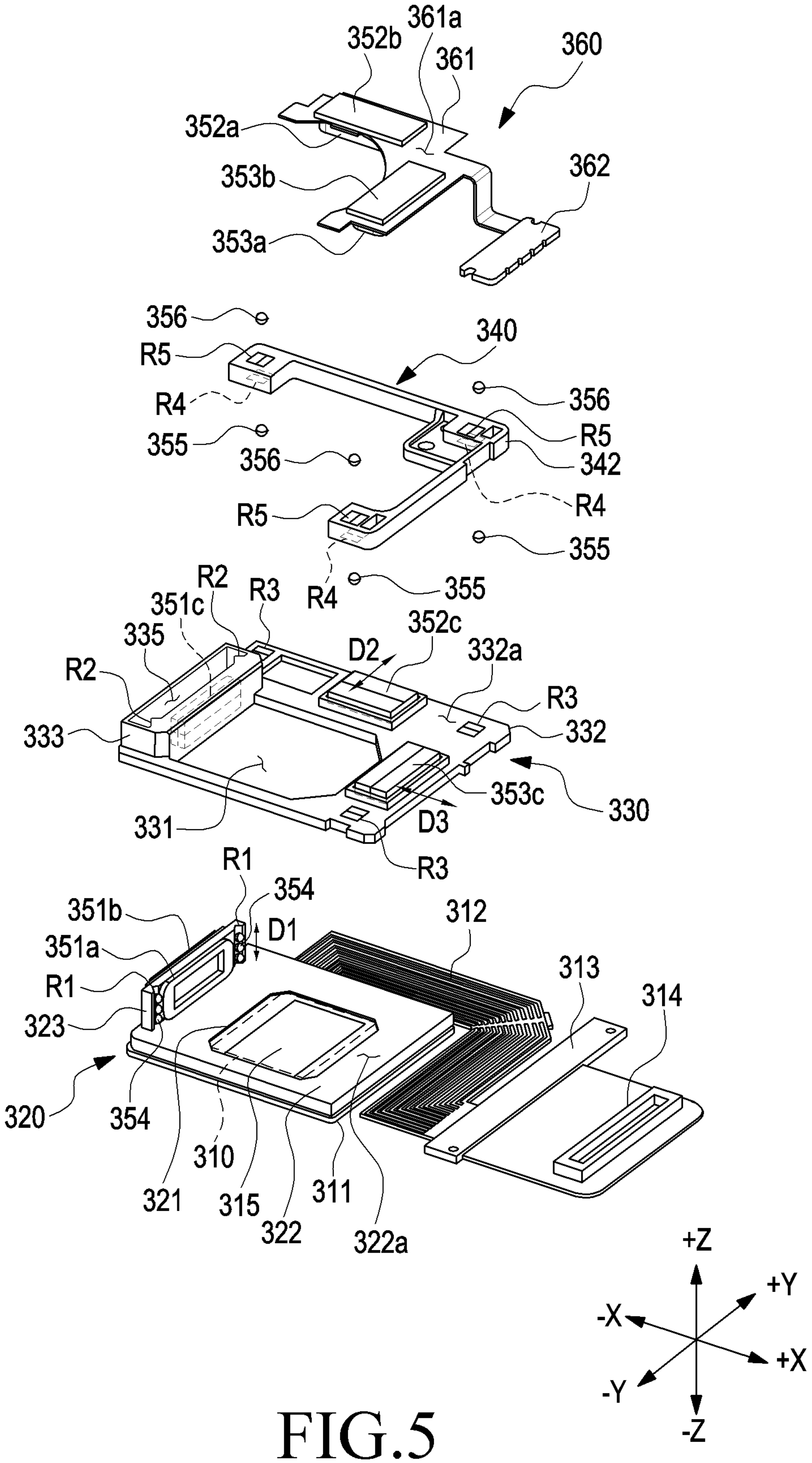
FIG. 5 is an exploded perspective view illustrating components received in a camera housing according to an embodiment.

FIG. 4 is an exploded perspective view illustrating a camera module 300 (e.g., the camera module 180 of FIG. 1) according to an embodiment. FIG. 5 is an exploded perspective view illustrating components received in a camera housing 301 according to an embodiment.

Referring to FIG. 4, a camera module 300 according to an embodiment may include a camera housing 301, a lens assembly 302, an image sensor 310, a first carrier 320, a second carrier 330, a third carrier 340, and/or a driving member 350. The camera module 300 may further include at least one substrate (e.g., the first PCB 311 or the second PCB 313) and/or at least one flexible printed circuit board (e.g., the first FPCB 312 or the second FPCB 360).

According to an embodiment, the camera housing 301 may include a base member 301*a* and a cover member 301*b*, and may substantially form the outer appearance of the camera module 300. The base member 301*a* may be a portion that refers to a base of the camera housing 301, and the cover member 301*b* may be a portion that is coupled to the base member 301*a* to form a space in which various components may be mounted inside the camera housing 301. According to an embodiment, when there is a component that generates electromagnetic waves among the components received in the space of the camera housing 301, the camera housing 301 may at least partially provide an electromagnetic shielding structure. For example, the driving member 350 may include a voice coil VCM that generates a driving force using an electric field or a magnetic field, and at least one of the base member 301*a* and the cover member 301*b* may provide an electromagnetic shielding structure. Referring to FIG. 4, according to an embodiment, a side wall may be formed to at least partially surround components received in the cover member 301*b*, but additionally or alternatively, a plurality of side walls may be formed in the base member 301*a*. As such, the camera housing 301 is not limited to any specific shape, but may have various shapes according to embodiments.

According to an embodiment, the lens assembly 302 may include at least one lens aligned along the optical axis O-I. Here, the optical axis O-I may refer to a virtual line passing through the center of the lens (centers of a plurality of lenses when there are the plurality of lenses) from the object side O to the image side I. The lens assembly 302 may be at least partially accommodated in the camera housing 301. According to an embodiment, the lens assembly 302 may be at least partially accommodated in the camera housing 301 while being surrounded by a barrel structure. The lens assembly 302 may dispose externally incident light in an appropriate number according to specifications of the camera module 300 or the electronic device (e.g., the electronic device 101 of FIG. 1). The number of lenses included in the lens assembly 302 may not be limited to any particular embodiment. According to an embodiment, the lens assembly 302 may be disposed to partially protrude toward the outside of the camera housing 301 while being at least partially accommodated in the camera housing 301. According to an embodiment, the lens assembly 302 may focus or guide light into the camera housing 301 while being fixedly disposed in the camera housing 301.

The image sensor 310 may be disposed in the base member 301*a*. In the camera module, the position of the image sensor is fixed in the state in which the image sensor is disposed in the camera housing (e.g., the base member), whereas in the camera module 300, the position of the image sensor 310 may be changed in the state in which the image sensor 310 is disposed in the base member 301*a*. In other words, an image sensor shift method may be applied to the camera module 300 according to an embodiment. The image sensor 310 may be moved in the X-axis, Y-axis, and/or Z-axis directions by the driving member 350. As is described below in detail, the driving member 350 may allow the image sensor 310 to move independently in the 3-axis directions of the spatial coordinates illustrated in FIG. 4.

The image sensor 310 may include, e.g., a sensor such as a complementary metal-oxide semiconductor (CMOS) or a charge coupled device (CCD). The image sensor 310, however, is not limited thereto but may rather include various elements that convert light, e.g., an object image, into an electrical image signal. The image sensor 310 may detect brightness, contrast ratio information, or color information about the subject from the light which has been transmitted through the lens assembly 302, thereby obtaining an image for the object.

The image sensor 310 may be disposed on one surface of the first PCB 311 toward the lens assembly 302. According to an embodiment, the first PCB 311 is a printed circuit board having the image sensor 310 disposed on one surface thereof, and may have a plate shape parallel to a plane (hereinafter, referred to as an "XY plane") formed by the X-axis and the Y-axis among the spatial coordinate axes illustrated in FIG. 4. An electrical signal may be applied to the image sensor 310 and/or a component (e.g., the first coil 351*a*) connected to the first PCB 311 through the first PCB 311. According to an embodiment, the surface of the first PCB 311 facing in the −Z-axis direction (first direction) may be formed to face the base member 301*a*, and the image sensor 310 may be disposed on the surface 311*a* facing in the +Z-axis direction (second direction). The image sensor 310 and/or the first PCB 311 may be connected to the second PCB 313 for electrical connection with another component (e.g., an image signal processor). At least one component (e.g., an image signal processor, or memory, for example) may be disposed on the second PCB 313, and may be connected to other components disposed outside the camera housing 301 through the at least one connector 314 disposed on the second PCB 313. According to an embodiment, the position of the second PCB 313 may be fixed with respect to the camera housing 301. If the first PCB 311 moves while the second PCB 313 is fixed, a relative position between the first PCB 311 and the second PCB 313 may change. In this case, the first PCB 311 and the second PCB 313 may be electrically connected through the first FPCB 312, and the electrical connection between the first PCB 311 and the second PCB 313 may be stably maintained using the first FPCB 312.

The camera module 300 according to an embodiment may include a carrier member to guide the first PCB 311 to reciprocate in the direction along the optical axis O-I, e.g., the direction parallel to the optical axis (−Z-axis direction or +Z-axis direction, hereinafter referred to as 'D1') and/or reciprocate in a direction (−X-axis direction or +X-axis direction and/or −Y-axis direction or +Y-axis direction, hereinafter referred to as 'D2, and/or D3') crossing the optical axis. The carrier member may be received in the camera housing 301 and may be disposed on the first PCB 311. The image sensor 310 may be disposed on the first PCB 311 so that the image sensor 310 may move in the direction D1 of the optical axis O-I by the carrier member, or additionally or alternatively, may reciprocate in the direction D2 and/or D3 crossing the optical axis. Here, the carrier member may include a first carrier 320, a second carrier 330, and a third carrier 330.

The first carrier 320 may be stacked up on the first PCB 311. According to an embodiment, the first carrier 320 may be disposed to at least partially surround the image sensor 310 on the surface 311*a* of the first PCB 311 facing in the +Z-axis direction (the second direction). According to an embodiment, the first carrier 320 may be coupled to the first PCB 311 to move like as a one-body. The first carrier 320 may be formed in a plate shape that is overall parallel to the XY plane, and may be coupled with the first PCB 311 to be movable in a direction parallel to at least one of three axes of the Cartesian coordinate system illustrated in FIG. 4. The first carrier 320 may have a first opening 321 formed in a central portion thereof and may include a first plate 322 (first peripheral portion) surrounding the first opening 321. According to an embodiment, a filter 315 may be disposed in the first opening 321. For example, an IR cut filter for blocking infrared (IR) may be disposed in the filter 315, and the IR cut filter may overlap the image sensor 310 when disposed in the first opening 321.

According to an embodiment, the first carrier 320 may include a first protruding guide portion 323 extending from the surface 322*a* of the first plate 322 facing in the +Z-axis direction (the second direction). The first protruding guide portion 323 may have a second opening 324 passing through one surface and the other surface of the first protruding guide portion 323 in a direction (e.g., +X-axis and/or −X-axis direction) crossing the optical axis. Further, a first recess R1 may be formed in the first protruding guide portion 323 to be elongated in the direction parallel to the optical axis D1 adjacent to the second opening 324. According to an embodiment, a pair of first recesses R1 may be provided on the left/right side of the second opening 324. Further, the first coil 351*a*, which is one of the driving members 350, may be received in the second opening 324. As illustrated in FIGS. 4 and 5, the camera module 300 according to an embodiment (the first embodiment) may include a first coil 351*a* disposed so that a magnetic field passing through the center of the first coil 351*a* in the state of being received in the second opening 324 faces in a direction (e.g., the +X-axis and/or −X-axis direction) crossing the optical axis O-I.

The second carrier 330 may be stacked up on the first carrier 320. According to an embodiment, the second carrier 330 may be disposed on the surface 322*a* of the first carrier 320 facing in the +Z-axis direction (the second direction). According to an embodiment, the second carrier 330 may not be fixedly coupled to the first carrier 320, but may be coupled so that the relative positions thereof may be changed. The second carrier 330 may be formed in a plate shape that is entirely parallel to the XY plane, and may have a third opening 331 (second opening) formed in a central portion thereof and include a second plate 332 (second peripheral portion) surrounding the third opening 331. According to an embodiment, the third opening 331 may be formed at a position corresponding to the first opening 321.

According to an embodiment, the second carrier 330 may include a second protruding guide portion 333 extending from the surface 332*a* of the second plate 332 facing in the +Z-axis direction (the second direction). A fourth opening 335 penetrating the second protruding guide 333 in the direction parallel to the optical axis D1 may be formed in the second protruding guide 333. The fourth opening 335 may pass through a surface of the second carrier 330 facing in the −Z-axis direction (first direction) from one surface of the second protruding guide portion 333. Further, a first magnet 351*c* capable of forming a magnet field in relation to the first coil 351*a* may be disposed adjacent to the fourth opening 335 inside the second protruding guide portion 333. The fourth opening 335 may face in the direction crossing the second opening 324 formed in the first protruding guide portion 323. The first protruding guide portion 323 may reciprocate along the direction parallel to the optical axis D1 while being received in the fourth opening 335 of the second protruding guide portion 333. Accordingly, the fourth opening 335 may be formed to have a size capable of reciprocating the first protruding guide portion 323 in a state in which the first coil 351*a* is received in the first opening 324 of the first protruding guide portion 323. According to an embodiment, the first protruding guide portion 323 may reciprocate along the direction parallel to the optical axis D1 while being fitted into the fourth opening 335 of the second protruding guide portion 333. In other words, the first carrier 320 may reciprocate along the direction parallel to the optical axis D1 while being coupled to the second carrier 330.

According to an embodiment, a second magnet 352*c* and a third magnet 353*c* may be disposed on the surface 332*a* of the second plate 332 of the second carrier 330 facing in the +Z-axis direction (the second direction). The second magnet 352*c* and the third magnet 353*c*, respectively, may be disposed at positions corresponding to the second coil 352*a* and the third coil 353*a* disposed on the cover member 301*b* side.

The third carrier 340 may be stacked up on the second carrier 330. According to an embodiment, the third carrier 340 may be disposed on the surface 332*a* of the second carrier 330 facing in the +Z-axis direction (the second direction). According to an embodiment, the third carrier 340 may not be fixedly coupled to the second carrier 330, but may be coupled so that the relative positions thereof may be changed. The third carrier 340 may linearly reciprocate in a direction D2 and/or D3 crossing the optical axis while being disposed on the second carrier 330. According to an embodiment, the third carrier 340 may have a frame shape including a portion extending in the direction D2 and/or D3 crossing the optical axis.

A second FPCB 360 may be disposed between the third carrier 340 and the cover member 301*b* of the camera housing 301. The second FPCB 360 may be provided to apply electrical signals to the second coil 352*a* and the third coil 353*a*. The second FPCB 360 may be fixed to the inner surface of the cover member 301*b* in a state in which the second coil 352*a* and the third coil 353*a* are disposed on one surface thereof. The second FPCB 360 may include a first portion 361 in which the second coil 352*a* and the third coil 353*a* are disposed and a second portion 362 extending from the first portion 361 and coupled to the second PCB 313.

Referring to FIGS. 4 and 5, the driving member 350 may include at least one coil and at least one magnet disposed to at least partially face the at least one coil. In this case, the at least one magnet may be disposed to face the at least one coil in a state of facing in a direction (e.g., the −X axis and/or the +X axis direction) crossing the optical axis, or may be disposed to face the at least one coil in a state of facing in the direction parallel to the optical axis (e.g., the +Z axis and/or the −Z axis direction). A plurality of driving members 350 may be provided. According to an embodiment, the driving member 350 may include a first driver 351, a second driver 352, and a third driver 353. In this case, the first driver 351 may be an auto focus driver for auto focus (AF) of the camera module 300, and the second driver 352 and the third driver 353 may be optical image stabilization drivers that are drivers for optical image stabilization (OIS) of the camera module 300.

The first driver 351 may include a first coil 351*a* that is a coil received in the second opening 324 of the first protruding guide portion 323 formed on the first carrier 320, and may include a first magnet 351*c* disposed at a position corresponding to the first coil 351*a* inside the second protruding guide portion 333 formed on the second carrier 330. The first magnet 351*c* may be disposed inside the second protruding guide portion 333 to face the first coil 351*a* in a direction (e.g., the −X axis and/or the +X axis direction) crossing the optical axis. The second driver 352 may include a second coil 352*a* fixedly disposed on the cover member 301*b* of the camera housing 301, and a second magnet 352*c* disposed at a position corresponding to the second coil 352*a* to face the second coil 352*a* on one surface of the second third coil 353*a* fixedly disposed on the cover member 301*b* of the camera housing 301, and a third magnet 352*c* disposed at a position corresponding to the third coil 353*a* to face the third coil 353*a* on one surface of the second carrier 330. The third magnet 353*c* may be disposed to face the third coil 353*a* in the direction parallel to the optical axis (e.g., the −Z axis and/or the +Z axis direction). The first coil 351*a* may be disposed on the first carrier 320 and may move together with the first carrier 320, and the second coil 352*a* and the third coil 353*a* may be fixedly disposed on the camera housing 301 side. In the illustrated drawings of the present disclosure, the first magnet 351*c*, the second magnet 352*c*, and the third magnet 353*c* may all be disposed on the second carrier 330, and may be respectively disposed to face the first coil 351*a*, the second coil 352*a*, and the third coil 353*a* at positions corresponding to the first coil 351*a*, the second coil 352*a*, and the third coil 353*a*. According to an embodiment, depending on design changes about to the second carrier 330 and/or the third carrier 340, the second magnet 352*c* and the third magnet 353*c* may be disposed on the third carrier 340. Alternatively, one of the second magnet 352*c* and the third magnet 353*c* may be placed on the second carrier 330, and the other may be placed on the third carrier 340.

According to an embodiment, the camera module 300 may include at least one yoke 351*b*, 352*b*, and 353*b*. The at least one yoke 351*b*, 352*b*, and 353*b* may align, e.g., an electric field and/or a magnetic field generated in the driving member 350 within a designated area or space. For example, at least one yoke 351*b*, 352*b*, and 353*b* allows an electric field and/or a magnetic field generated in the driving member 350 to act within a designated area or space, thereby reducing power applied to the at least one coil 351*a*, 352*a*, and 353*a* or contributing to downsizing the driving member 350. According to an embodiment, by reducing power consumption or downsizing the driving member 350, it is possible to easily mount the camera module 300 in a downsized electronic device and to increase power efficiency in an auto focus operation or an optical image stabilization operation. According to an embodiment, the first yoke 351*b* included in the first driver 351 may be positioned on the opposite side of the first magnet 351*c* with respect to the position of the first coil 351*a*. The first yoke 351*b* may serve to increase the strength of the magnetic force acting between the first coil 351*a* and the first magnet 351*c*. According to an embodiment, a separate FPCB different from the first FPCB 312 and the second FPCB 360 may be additionally disposed between the first coil 351*a* and the first yoke 351*b* so as to be electrically connected to the first PCB 311. For example, a force for bringing the outer surface of the first protruding guide portion 323 of the first carrier 320 and the inner surface of the second protruding guide portion 333 of the second carrier 330 into tight contact (or adsorption) with each other may be generated by the first yoke 351*b* and the first magnet 351*c*. Similar to the arrangement and operation principle of the first yoke 351*b*, the second yoke 352*b* of the second driver 352 and/or the third yoke 353*b* of the third driver 353 may be provided. Hereinafter, in describing the first driver 351, the second driver 352, and/or the third driver 353, a description of the yoke (the first yoke 351*b*, the second yoke 352*b*, and/or the third yoke 353*b*) may be omitted for convenience when referring to the interaction between the coil and the magnet.

According to an embodiment, when the first protruding guide portion 323 is received in the fourth opening 335 of the second protruding guide portion 333, a first guide ball 354 may be disposed between the first protruding guide portion 323 and the second protruding guide portion 333. As the camera module 300 includes the first guide ball 354, the friction force generated in the reciprocation of the first protruding guide portion 323 with respect to the second protruding guide portion 333 may be reduced, smoothing reciprocation. For example, when the first protruding guide portion 323 is received in the fourth opening 335, the first guide ball 354 may be disposed to contact each of the outer surface of the first protruding guide portion 323 and the inner surface of the second protruding guide 333 in a state in which the outer surface of the first protruding guide portion 323 and the inner surface of the second protruding guide 333 are spaced apart from each other by a designated interval. Further, the first guide ball 354 may operate in a ball bearing manner while being in contact with each of the outer surface of the first protruding guide portion 323 and the outer surface of the second protruding guide portion 333, thereby smoothing linear reciprocation of the first protruding guide portion 323 with respect to the second protruding guide portion 333. According to an embodiment, a plurality of first guide balls 354 may be arranged side by side along the direction to the optical axis D1. Referring to FIGS. 4 and 5 together, according to an embodiment, a first recess R1 may be formed in an outer surface of the first protruding guide portion 323, and a second recess R2 may be formed in an inner surface of the second protruding guide 333 at a position corresponding to the first recess R1. In this case, the first recess R1 and the second recess R2 may serve as ball guide rails for the first guide ball 354 to roll while being seated thereon. The first recess R1 and the second recess R2 may be, e.g., grooves having a cross section of a 'V' shape. The first guide ball 354 may be disposed between the first recess R1 and the second recess R2 and may be rolled when the first protruding guide portion 323 linearly reciprocates with respect to the second protruding guide portion 333.

The camera module 300 may further include a second guide ball 355 and a third guide ball 356. The second guide ball 355 may be disposed between the second carrier 330 and the third carrier 340, and the third guide ball 356 may be disposed between the third carrier 340 and the cover member 301*b* of the camera housing 301. The second driver 352 and the third driver 353 may reciprocate the first carrier 320 in the direction D2 and/or D3 crossing the optical axis due to the ball bearing rotation by using the second guide ball 355 and the third guide ball 356. By including the second guide ball 355 and the third guide ball 356, the camera module 300 may reduce the frictional force generated in the reciprocation of the carrier member, smoothing reciprocation. According to an embodiment, a plurality of second guide balls 355 may be disposed between the second carrier 330 and the third carrier 340. According to an embodiment, the plurality of second guide balls 355 may be provided to guide the third carrier 340 while contacting the surface of the third carrier 340 facing in the −Z-axis direction (the first direction) and supporting the third carrier 340 at three different positions. Further, a plurality of third guide balls 356 may be disposed between the third carrier 340 and the cover member 301*b* of the camera housing 301. According to an embodiment, the plurality of third guide balls 356 may contact the surface 342*a* of the third carrier 340 facing in the +Z-axis direction (the second direction), and may be disposed at positions corresponding to the positions where the plurality of second guide balls 355 are disposed.

Referring to FIGS. 4 and 5 together, according to an embodiment, a third recess R3 may be formed in the surface 332*a* of the second carrier 330 facing in the +Z-axis direction (the second direction), and a fourth recess R4 may be formed in the surface of the third carrier 340 facing in the −Z-axis direction (the first direction) at a position corresponding to the third recess R3. A fifth recess R3 may be formed in the surface 342*a* of the third carrier 340 facing in the +Z-axis direction (the second direction). A sixth recess may be formed in an inner surface of the cover member 301*b* facing the third carrier 340 at a position corresponding to the fifth recess R5. The third recess R3 and the fourth recess R4 may serve as ball guide rails for the second guide ball 355 to roll while being seated thereon. The fifth recess R5 and the sixth recess may serve as ball guide rails for the third guide ball 356 to roll while being seated thereon. The third recess R3, the fourth recess R4, the fifth recess R5, and/or the sixth recess may be, e.g., a groove having a cross section of a 'V' shape.

Hereinafter, components constituting the camera module 300 are described in more detail with reference to FIGS. 6 to 11. In describing each of the above-described components, no duplicate description is given.

Figure 6:
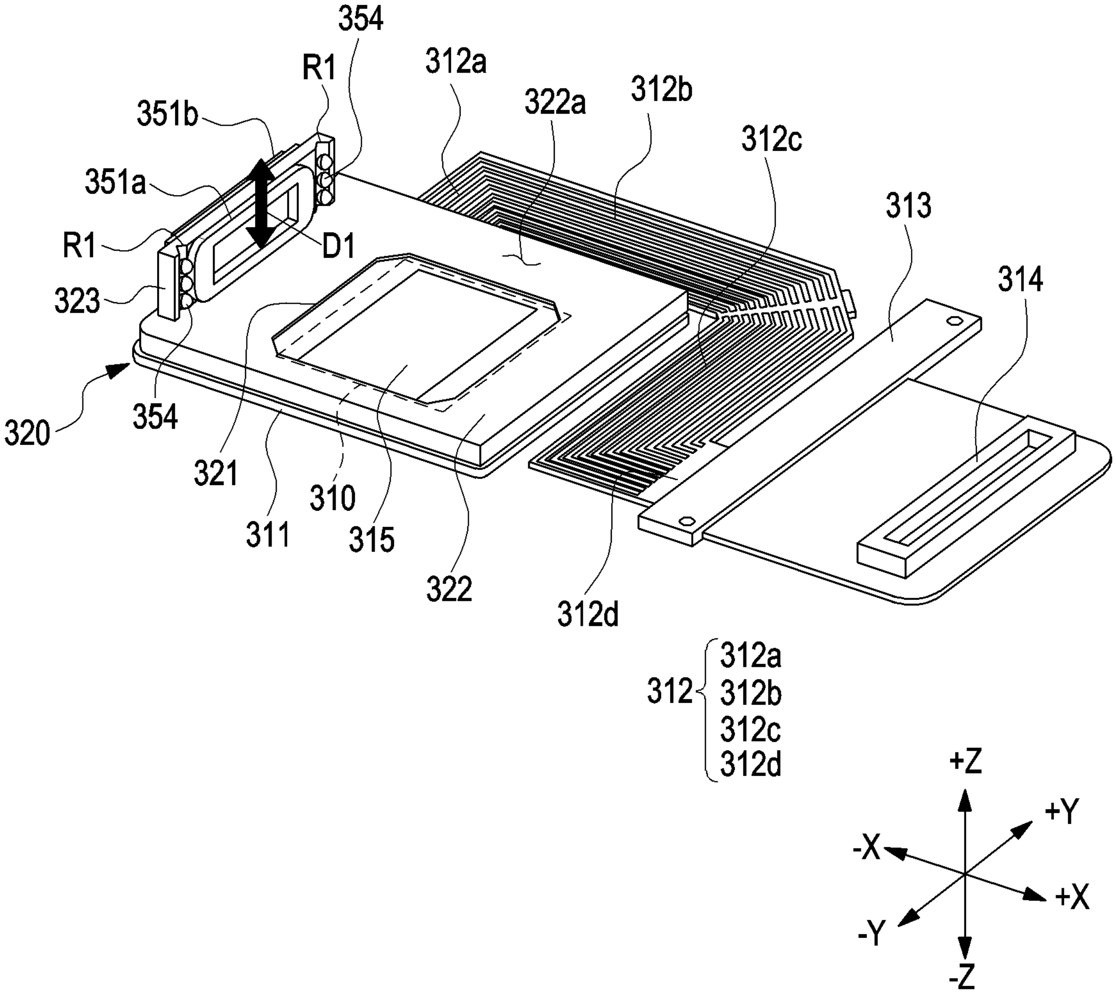
FIG. 6 is a perspective view illustrating a first PCB and a first carrier according to an embodiment.

FIG. 6 is a perspective view illustrating a first PCB 311 and a first carrier 320 according to an embodiment.

As described above, the auto focus function and the shake correction function of the lens assembly driving method may be difficult to equip in a downsized electronic device. For example, given the volume of the lens assembly, space for driving, and/or driving components for moving the lens assembly, the auto focus first and the shake correction first of the lens assembly driving method may be difficult to equip in a downsized electronic device. According to an embodiment, as the lens assembly is fixed on the optical axis, and the image sensor is moved on the plane perpendicular to the optical axis, an auto focus function and an optical image stabilization function may be implemented. The auto focus function and optical image stabilization function in a manner of driving the image sensor which is lighter than the lens assembly may render it easy to secure a space for permitting driving or a space for arranging driving components and reduce current consumption.

Referring to FIG. 6, the image sensor 310 may be disposed to at least partially overlap the filter 315 on a surface of the first PCB 311 facing in the +Z-axis direction (the second direction). The first carrier 320 may be disposed on a surface of the first PCB 311 facing in the +Z-axis direction (the second direction), and may be formed to at least partially surround the image sensor 310. The first carrier 320 may be coupled to the first PCB 311 to move as if they were one body, thereby guiding the movement of the image sensor 310. The first carrier 320 may be formed of a metal material and/or a non-metal (e.g., polymer) material, and may be formed of a rigid material to protect the image sensor 310 from an external impact.

According to an embodiment, the first PCB 311 may be electrically connected to the second PCB 313 where at least one connector is disposed using the first FPCB 312. In this case, the first FPCB 312 may include a first end portion 312*a* coupled to the first PCB 311, a second end portion 312*d* coupled to the second PCB 313, and extensions 312*b* and 312*c* extending from the first end portion 312*a* and connected to the second end portion 312*d*. In the embodiment illustrated in FIG. 6, the extensions 312*b* and 312*c* are illustrated as including a first extension 312*b* and a second extension 312*c* extending in the width direction (X-axis direction) of the electronic device and the length direction (Y-axis direction) of the electronic device, but are not necessarily limited thereto. For example, in the embodiment illustrated in FIG. 6, the L-shaped extensions 312*b* and 312*c* are illustrated, but may have different shapes, e.g., the shape of "U" or "S", and the length and shape of the extensions 312*b* and 312*c* may vary according to embodiments.

Figure 7A:
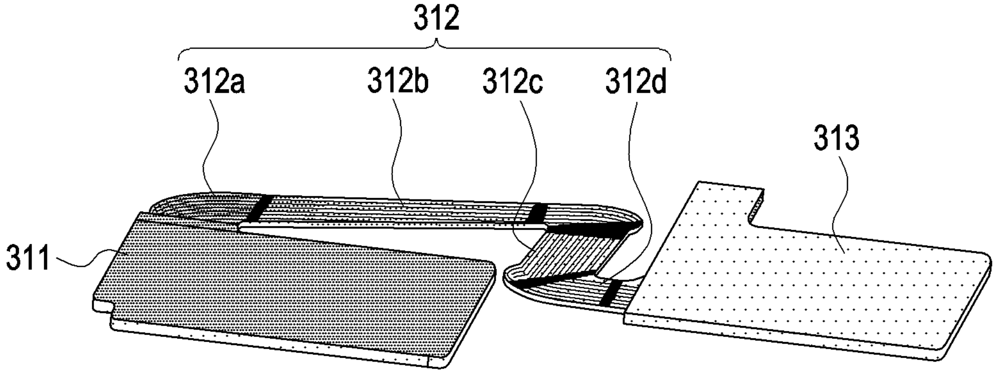
FIG. 7A is a view illustrating a state in which a first PCB is moved downward with respect to a second PCB along a direction parallel to the optical axis according to an embodiment.
Figure 7B:
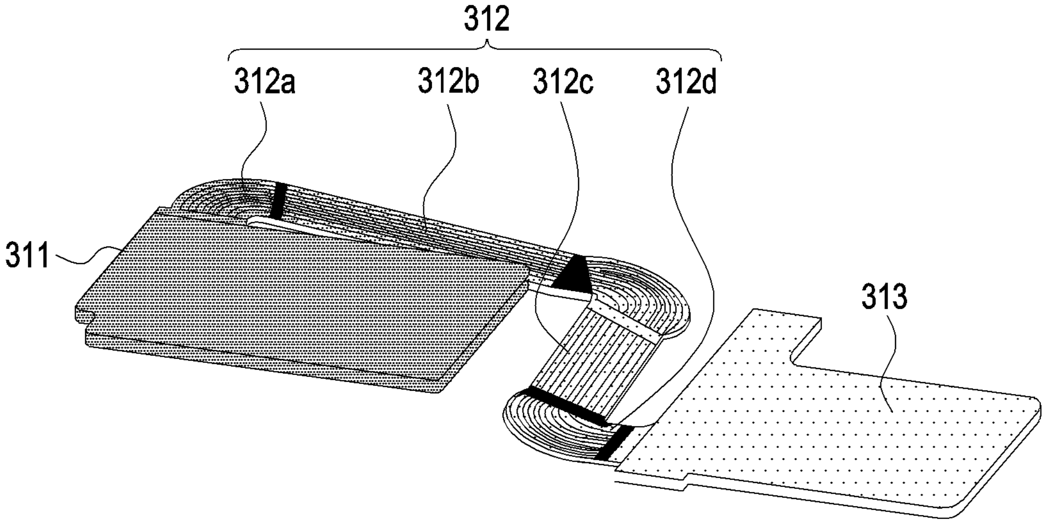
FIG. 7B is a view illustrating a state in which a first PCB is moved upward with respect to a second PCB along a direction parallel to the optical axis according to an embodiment.

FIG. 7A is a view illustrating a state in which a first PCB 311 is moved downward with respect to a second PCB 313 along a direction parallel to the optical axis according to an embodiment. FIG. 7B is a view illustrating a state in which a first PCB 311 is moved upward with respect to a second PCB 313 along a direction parallel to the optical axis according to an embodiment.

Referring to FIGS. 7A and 7B, if the first PCB 311 coupled to the first carrier 320 moves in the direction parallel to the optical axis, the image sensor 310 disposed on one surface of the first PCB 311 may also move in the direction parallel to the optical axis. The second PCB 313 may be fixed to the electronic device 101 or the camera module 300, and the first FPCB 312 may be disposed between the first PCB 311 and the second PCB 313 to maintain an electrical connection. At least a portion of the first FPCB 312 may be formed of a flexible material, and may be partially deformed when the first PCB 311 moves. According to an embodiment, at least a portion of the first FPCB 312 may have a curved shape or an arc shape (or trajectory). When the first PCB 311 moves, stress may be partially generated in the first FPCB 312. By forming at least a portion of the first FPCB 312 in a curved or arc shape, the stress may be dispersed, thereby enhancing the durability or reliability of the first FPCB 312.

Figure 8A:
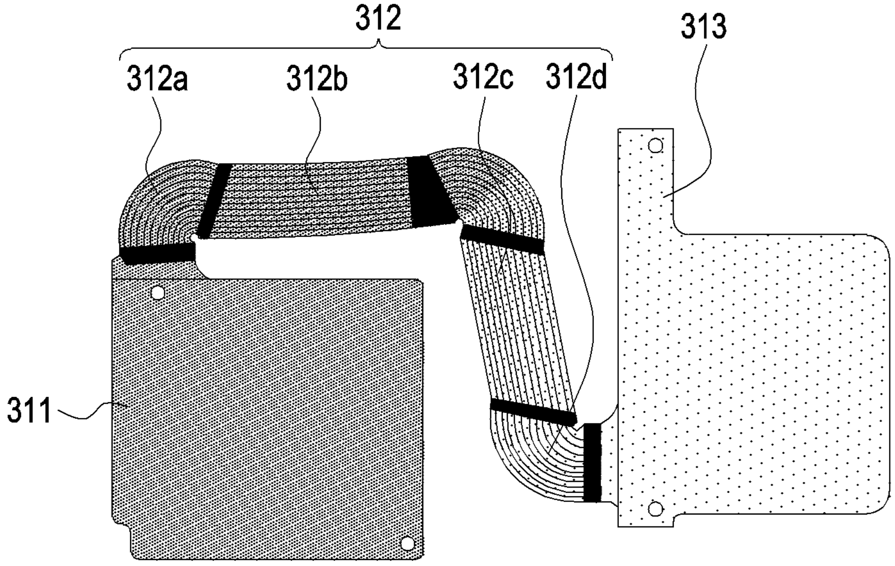
FIG. 8A is a view illustrating a first PCB and a second PCB are viewed in a direction parallel to the optical axis according to an embodiment.
Figure 8B:
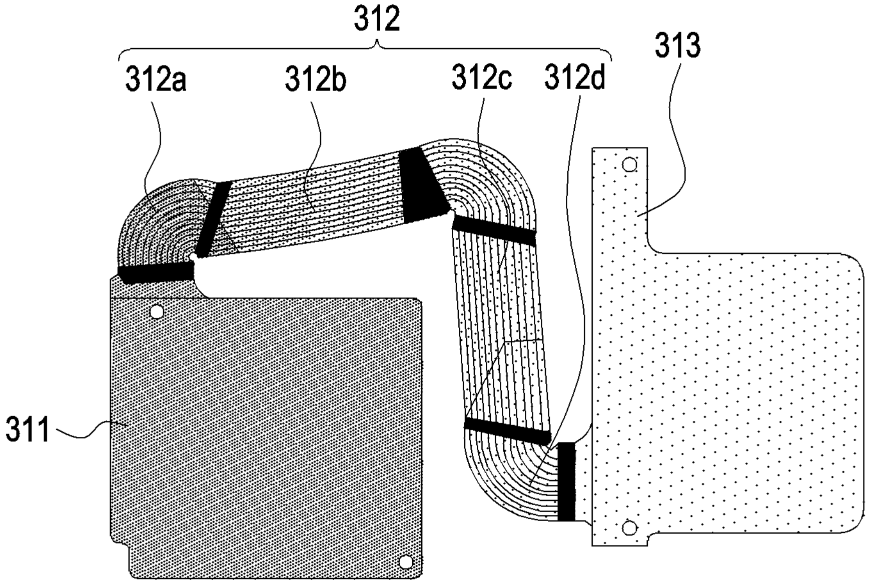
FIG. 8B is a view illustrating a state in which a first PCB is moved a predetermined distance along a direction crossing an optical axis according to an embodiment.

FIG. 8A is a view illustrating a first PCB 311 and a second PCB 313 are viewed in a direction parallel to the optical axis according to an embodiment. FIG. 8B is a view illustrating a state in which a first PCB 311 is moved a predetermined distance along a direction crossing an optical axis according to an embodiment. FIGS. 8A and 8B illustrate the first PCB 311 and the second PCB 313 according to the embodiment of FIGS. 7A and 7B as viewed in the direction parallel to the optical axis.

Referring to FIGS. 8A and 8B, in a state in which the position of the second PCB 313 is fixed to the electronic device 101 or the camera module 300, if the first PCB 311 moves in a direction crossing the optical axis, the first FPCB 312 may be partially deformed. For example, when the first PCB 311 moves in a direction crossing the optical axis with respect to the second PCB 313, the extensions 312*b* and 312*c* of the first FPCB 312 may be stretched or contracted. According to an embodiment, the first FPCB 312 may include at least one slit and/or a plurality of conducting lines. As the first FPCB 312 includes at least one slit, the repulsive force or elastic restoring force of the first FPCB 312 may be reduced, thereby increasing the durability and service life of the first FPCB 312.

According to an embodiment, the electronic device 101 or the processor (e.g., the processor 120 of FIG. 1) may move the first PCB 311 where the image sensor 310 is disposed in the direction parallel to the optical axis based on phase difference information or contrast information about the image or the video. The an embodiment illustrated in FIGS. 7A and 7B may illustrate the behavior of the first FPCB 312 when the first PCB 311 where the first image sensor 310 is disposed moves in the direction parallel to the optical axis, e.g., the behavior during auto focus.

According to an embodiment, the electronic device 101 or a sensor module (e.g., a gyro sensor and/or an acceleration sensor as one of the sensor modules 176 of FIG. 1) may be configured to detect a vibration applied to the housing 210 or the camera module 300 of the electronic device. The electronic device 101 or the processor (e.g., the processor 120 of FIG. 1) may move the first PCB 311 where the image sensor 310 is disposed in at least one of the X and Y axes based on the vibration detected through the sensor module 176. The embodiment an embodiment illustrated in FIGS. 8A and 8B may illustrate the behavior of the first FPCB 312 when the first PCB 311 where the first image sensor 310 is disposed moves in a direction crossing the optical axis, e.g., the behavior during optical image stabilization. In another embodiment, the electronic device 101 or the processor 120 may identify whether the vibration detected by the sensor module 176 is the shaking of the user's hand, and may move the first PCB 311 when it is identified as the shaking of the user's hand. Identifying vibration in a general use environment and hand shaking in capturing may be based on data related to the acceleration, direction, and/or strength of vibration, and such data may be stored in the electronic device 101 and/or memory (e.g., the memory 130 of FIG. 1). By moving the first PCB 311 in a direction crossing the optical axis as described above, vibration applied to the housing 210 or the camera module 300 of the electronic device by an external force may be compensated, and the quality of the captured image or video may be enhanced.

Figure 9:
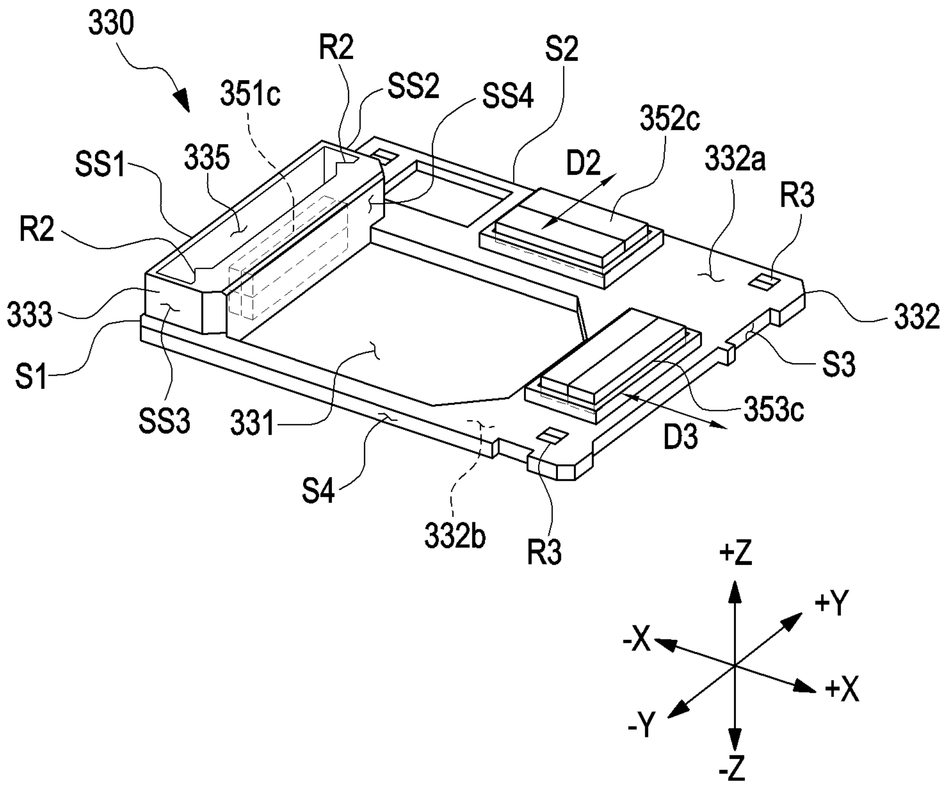
FIG. 9 is an exploded perspective view illustrating a second carrier according to an embodiment.

FIG. 9 is an exploded perspective view illustrating a second carrier 330 according to an embodiment.

The second carrier 330 may include a second plate 332 including a surface 332*a* facing in the +Z-axis direction (the second direction) and a surface 332*b* facing in the −Z-axis direction (the first direction). When the second plate 332 is thinner than the width of the electronic device in the width direction (X-axis direction) or the width of the electronic device in the length direction (Y-axis direction), the second plate 332 is not limited to being formed of a polyhedron such as a hexahedron, but may be formed in other various shapes. As an embodiment, when it is exemplified that the second plate 332 is formed of a thin hexahedron, the second plate 332 may include a first side surface S1, a second side surface S2, a third side surface S3, and a fourth side surface S4 between the surface 332*a* facing the Z-axis direction (the second direction) and the surface 332*b* facing in the −Z-axis direction (the first direction). Further, an opening 331 may be formed at a position corresponding to a portion of the second plate 332 overlapping the image sensor 310. The opening 331 may be formed through the surface 332*a* of the second carrier 330 facing in the +Z-axis direction (the second direction) and the surface 332*b* of the second carrier 330 facing in the −Z-axis direction (the first direction). The second carrier 330 may further include a second protruding guide portion 333 protruding from the second plate 332 in the direction parallel to the optical axis. According to an embodiment, the second protruding guide portion 333 may protrude from the surface 332*a* of the second carrier 330 facing in the +Z-axis direction (the second direction) toward the +Z-axis direction (the second direction). According to an embodiment, the second magnet 352*c* and the third magnet 353*c* may be disposed on the surface 332*a* of the second carrier 330 facing in the +Z-axis direction (the second direction). In other words, the second protruding guide portion 333, the second magnet 352*c*, and the third magnet 353*c* are disposed on the surface 332*a* of the second carrier 330 facing in the +Z-axis direction (the second direction), and they each may be disposed adjacent to any one of the side surfaces S1, S2, S3, and S4 of the second plate 332. For example, according to the an embodiment illustrated in FIG. 9, the second protruding guide portion 333 is disposed adjacent to the first side surface S1 of the second plate 332, the second magnet 352*c* is disposed adjacent to the second side surface S2, and the third magnet 353*c* is disposed adjacent to the third side surface S3. However, the disclosure is not necessarily limited thereto, and other an embodiment may be applied. The first magnet 351*c* may be disposed inside the second protruding guide portion 333. For example, the second protruding guide portion 333 may include a 1-1th side surface SS1, a 1-2th side surface SS2, a 1-3th side surface SS3, and a 1-4th side surface SS4 extending from the first side surface S1. The fourth opening 335 may be formed adjacent to the 1-1th side surface SS1, and the first magnet 351*c* may be disposed between the fourth opening 335 and the 1-4th side surface SS4. According to an embodiment, a third recess R3 for receiving the second guide ball 355 may be formed in the second carrier 330. The third recess R3 may be formed in the surface 332*a* of the second plate 332 facing in the +Z-axis direction (the second direction). The third recess R3 may include a plurality of third recesses R3 formed near an edge vertex of the second plate 332. According to an embodiment, the plurality of third recesses R3 may all have the same shape. For example, all of the plurality of third recesses R3 may have a V-shaped groove in one direction (e.g., the X-axis direction).

Figure 10:
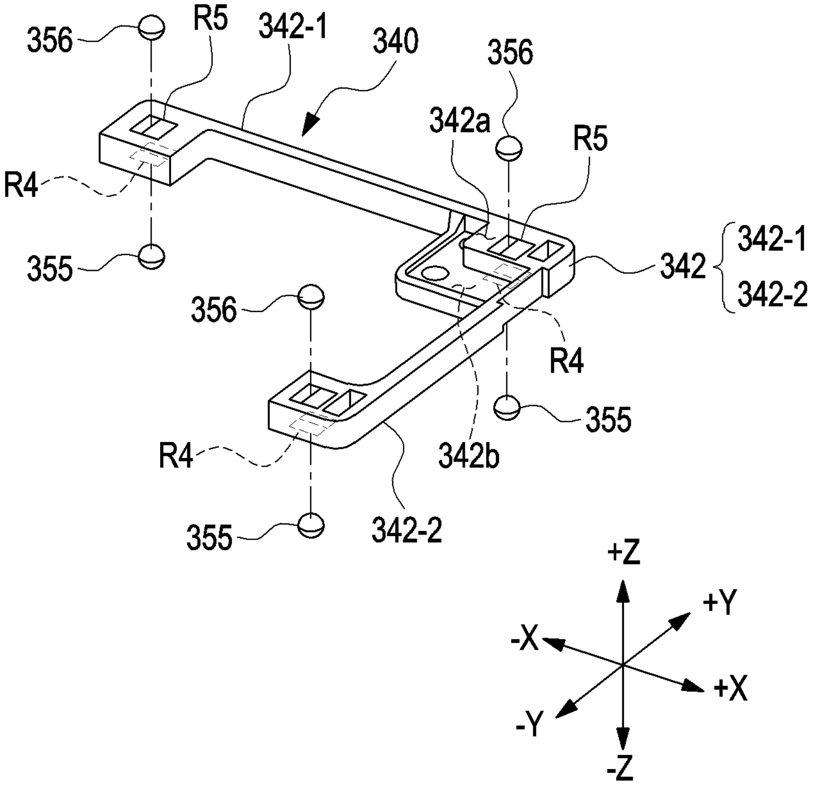
FIG. 10 is an exploded perspective view illustrating a third carrier according to an embodiment.

FIG. 10 is an exploded perspective view illustrating a third carrier 340 according to an embodiment.

The third carrier 340 may have a frame shape including a portion extending in the direction D2 and/or D3 crossing the optical axis. For example, the third carrier 340 may be disposed lying on the surface 332*a* of the second carrier 330 facing in the +Z-axis direction (the second direction), and may be formed in an L-shape that does not interfere with the second protruding guide portion 333 of the second carrier 330, the second magnet 352*c*, and the third magnet 353*c*. According to an embodiment, the third carrier 340 may include a frame 342 including a first arm 342-1 and a second arm 342-2. A fourth recess R4 may be formed in the surface 342*b* of the frame 342 facing in the −Z-axis direction (the first direction), and a fifth recess R5 may be formed in the surface 342*b* of the frame 342 facing in the +Z-axis direction (the second direction). The fourth recess R4 and the fifth recess R5, respectively, may be formed at positions corresponding to each other on surfaces facing in opposite directions of the frame 342. The fourth recess R4 and the fifth recess R5 may be formed to perform rolling motion while the second guide ball 355 and the third guide ball 356, respectively, are seated and/or received. A plurality of fourth recesses R4 and a plurality of fifth recesses R5 may be formed, respectively. According to an embodiment, the plurality of fourth recesses R4 may all have the same shape, and the plurality of fifth recesses R5 may all have the same shape. For example, all of the plurality of fourth recesses R4 may have a V-shaped groove in one direction (e.g., the X-axis direction). In this case, the fourth recess R4 may be grooved in the same direction as the third recess R3 of the second carrier 330. Unlike this, all of the plurality of fifth recesses R5 may have a V-shaped groove in a direction (e.g., the Y-axis direction) different from that of the fourth recesses R4. In the drawings, it is illustrated that the third recess R3 and the fourth recess R4 have a shape in which a V-shaped groove is cut in the X-axis direction, and the fifth recess R5 has a shape in which a V-shaped groove is cut in the Y-axis direction. However, unlike this, in an applicable embodiment, a V-shaped groove cut in the X-axis direction may be formed in the fifth recess R5, and the third recess R3 and the fourth recess R4 may be cut in the Y-axis direction. As described above, the directions of the grooves formed in the fourth recess R4 and the fifth recess R5 may be orthogonal to each other, and the second guide ball 355 and the third guide ball 356 may roll in different directions while being seated and/or received in the fourth recess R4 and the fifth recess R5, respectively. A sixth recess may be formed in an inner surface of the cover member 301*b* included in the camera housing 301, at a position corresponding to the fifth recess R5, which has a V-shaped groove in the same direction as the fifth recess R5 and allows the third guide ball 356 to roll while being seated and/or received therein.

Figure 11:
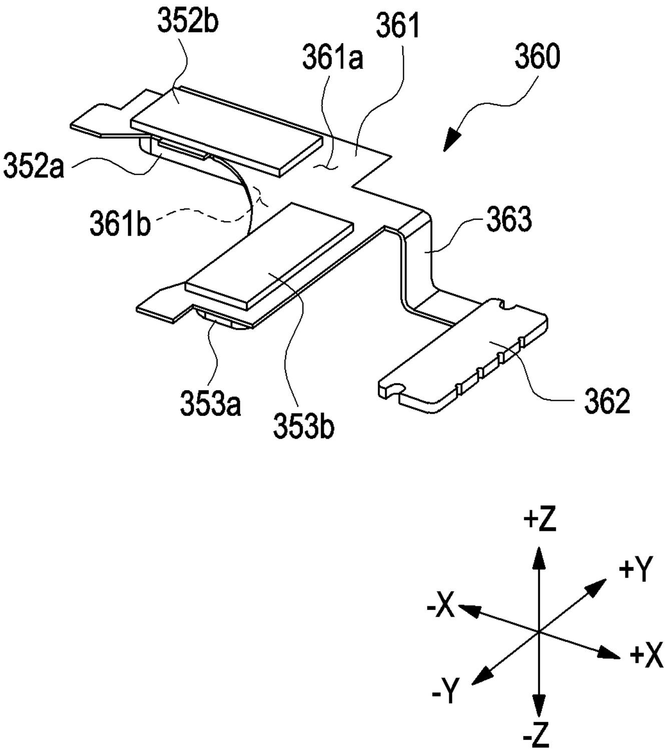
FIG. 11 is an exploded perspective view illustrating a second flexible printed circuit board (FPCB) according to an embodiment.

FIG. 11 is an exploded perspective view illustrating a second FPCB 360 according to an embodiment.

Referring to FIG. 11, the second FPCB 360 may include a first portion 361 and a second portion 362, and a third portion 363 between the first portion 361 and the second portion 362. The first portion 361 is a portion where the second coil 352*a* and the third coil 353*a* are disposed, and may be fixedly disposed on the inner surface of the cover member 301*b* included in the camera housing 301. The second portion 362 may be a portion extending from the first portion 361 and coupled to the second PCB 313, and the third portion 363 may be an extension (elongated portion) between the first portion 361 and the second portion 362. Unlike the extensions 312*b* and 312*c* of the first FPCB 312 formed to extend and/or bend in the width direction (or the length direction) of the camera module 300, the third portion 363 may be formed to extend and/or bend in the height direction of the camera module 300.

According to an embodiment, as at least some (e.g., the second coil 352*a* and the third coil 353*a*) of the coils to which the electrical signal is applied may be fixedly disposed in the camera housing 301, it may be possible to increase driving efficiency while mitigating and/or preventing noise as compared with embodiments in which the coils are not fixedly disposed.

Figure 12:
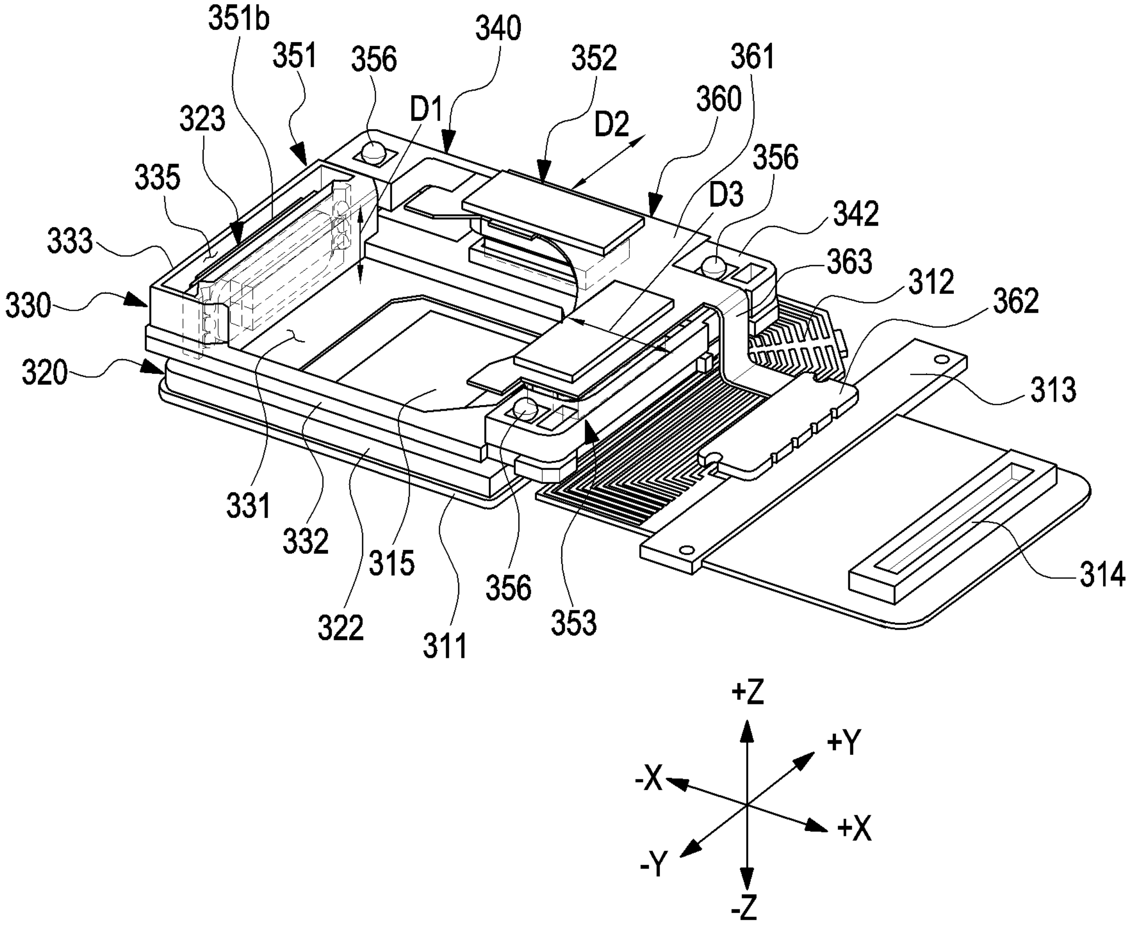
FIG. 12 is a perspective view illustrating a carrier assembly and a second FPCB according to an embodiment.
Figure 13:
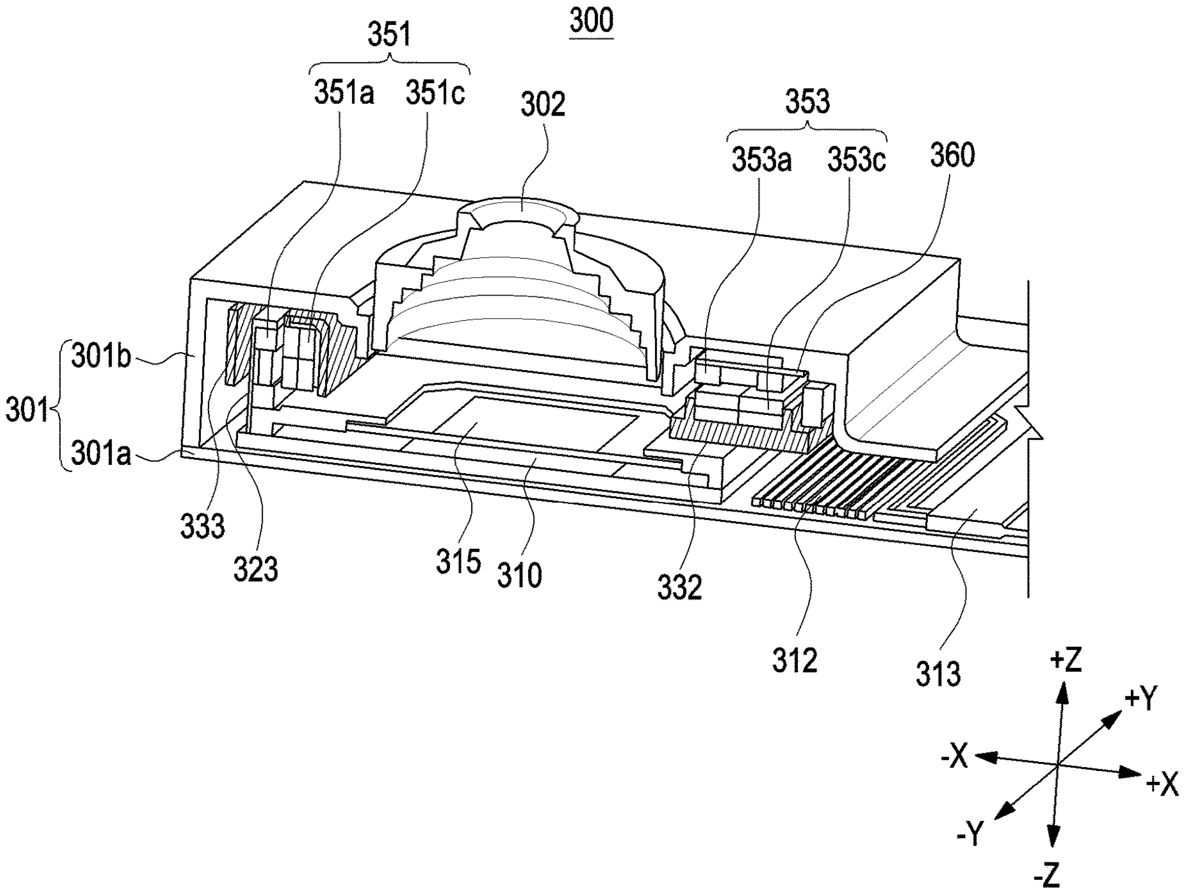
FIG. 13 is a view illustrating a state in which a carrier assembly is disposed in a camera housing according to an embodiment.

FIG. 12 is a perspective view illustrating a carrier assembly and a second FPCB 360 according to an embodiment. FIG. 13 is a view illustrating a state in which a carrier assembly is disposed in a camera housing 301 according to an embodiment.

FIGS. 12 and 13 illustrate a carrier assembly in which a first carrier 320, a second carrier 330, and a third carrier 340 coupled with the first PCB 311 are assembled to roll and a second FPCB 360 where a coil is disposed.

The first carrier 320 may be designed so that the first protruding guide portion 323 may reciprocate along the optical axis (e.g., the optical axis O-I of FIG. 4) direction D1 on the fourth opening 335 of the second protruding guide portion 333 when assembled with the second carrier 330. Further, over the second plate 332 of the second carrier 330, e.g., in an area between the second protruding guide portion 333 and the second magnet 352*c* and an area between the second magnet 352*c* and the third magnet 353*c*, a flat surface having a lower step than the second protruding guide portion 333, the second magnet 352*c*, and the third magnet 353*c* may be formed, where end portions of the first arm 341-1 and the second arm 341-2 of the third carrier 340 may be seated. The carrier assembly in which the first carrier 320, the second carrier 330, and the third carrier 340 are assembled may be formed in a form in which the overall assembly does not significantly increase in height or volume although the components are coupled together, e.g., a form in which at least portions of the components are disposed on the same plane (e.g., the XY plane) although assembled as shown in FIG. 12.

According to an embodiment, in the camera module 300, if an electrical signal is applied to at least one coil (the first coil 351*a*, the second coil 352*a*, and/or the third coil 353*a*), at least one magnet (the first magnet 351*c*, the second magnet 352*c*, and/or the third magnet 353*c*) which forms a magnetic field with the at least one coil (the first coil 351*a*, the second coil 352*a*, and/or the third coil 353*a*) and the component (e.g., the first carrier 320, the second carrier 330, and/or the third carrier 330 coupled with the magnet may be partially or wholly moved.

Figure 14:
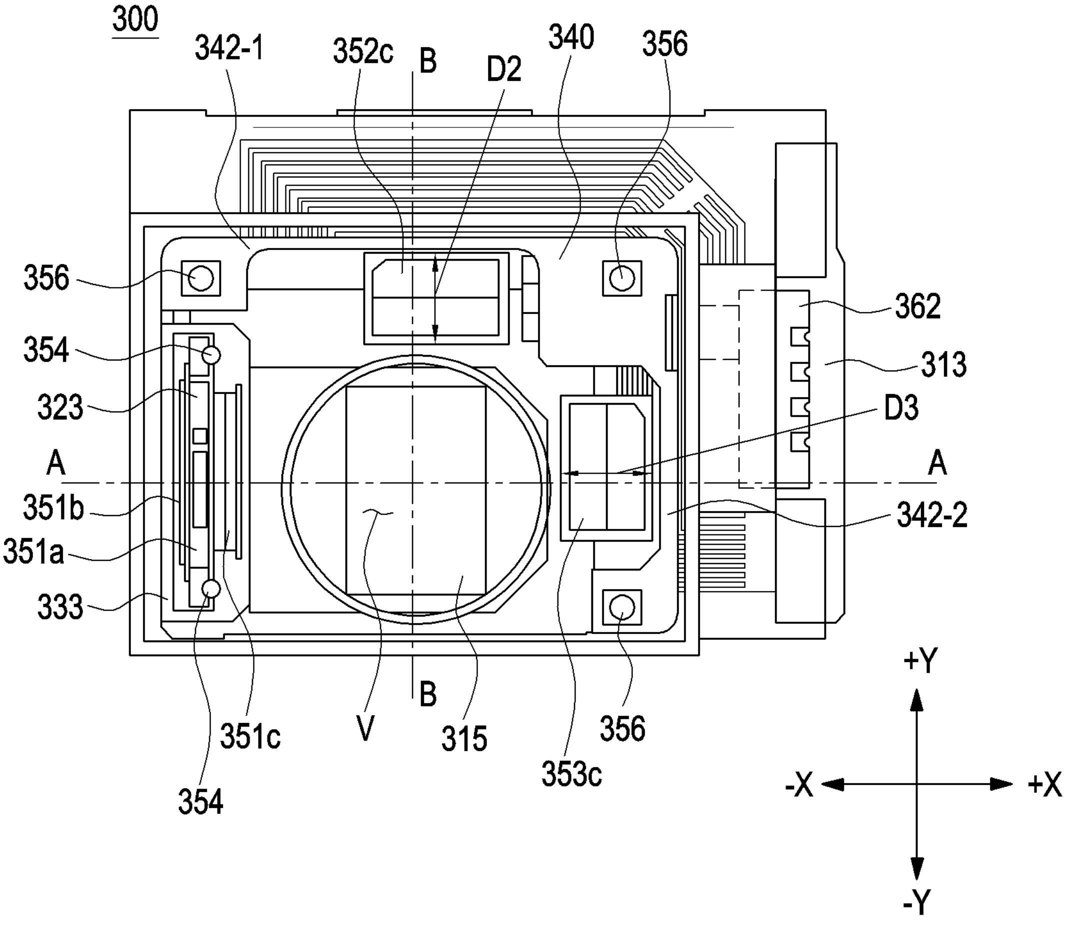
FIG. 14 is a view illustrating a camera module viewed in a direction parallel to the optical axis according to an embodiment.
Figure 15:
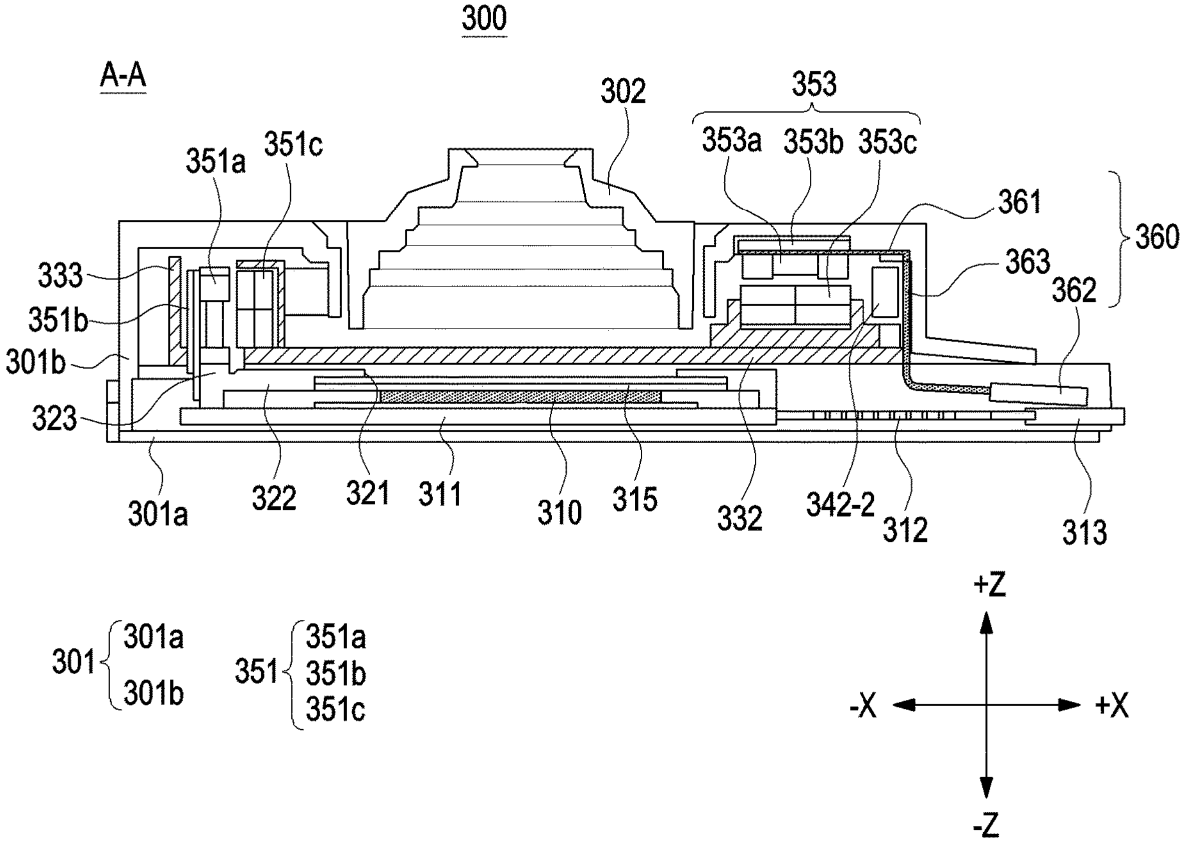
FIG. 15 is a view illustrating a camera module according to the embodiment of FIG. 14, taken along direction A-A.
Figure 16:
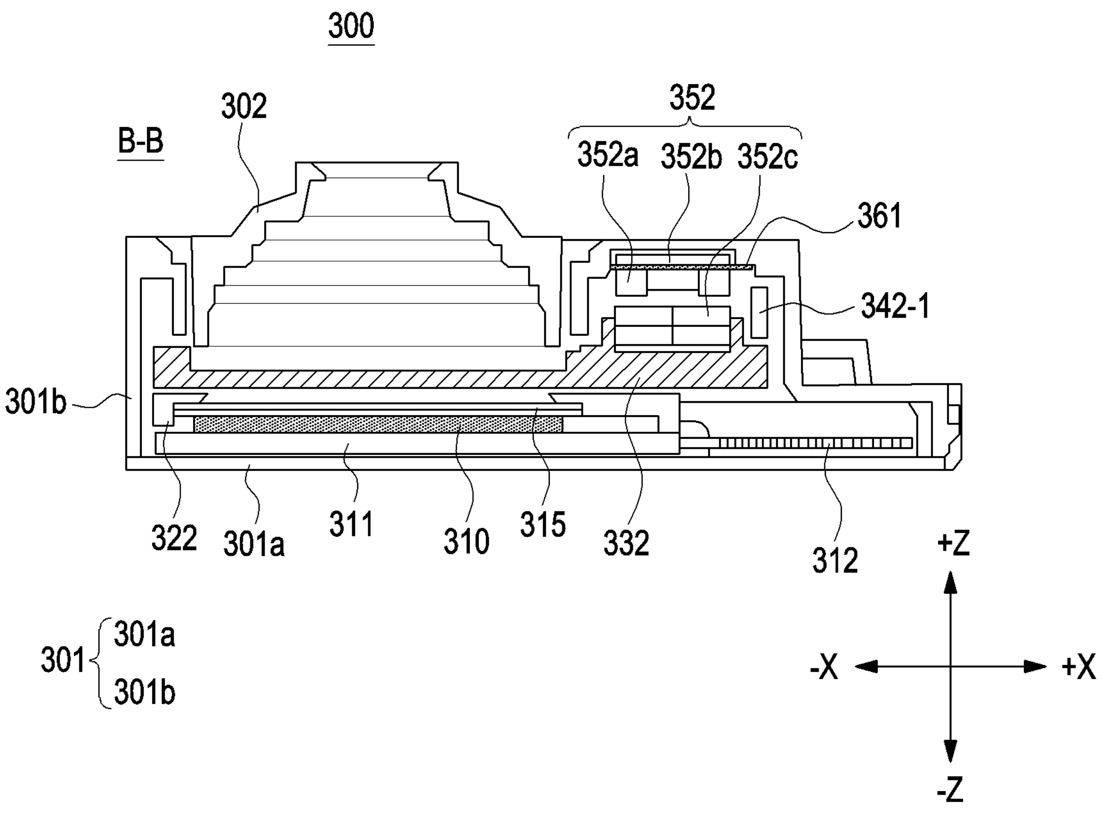
FIG. 16 is a view illustrating a camera module according to the embodiment of FIG. 14, taken along direction B-B.

FIG. 14 is a view illustrating a camera module 300 viewed in a direction parallel to the optical axis according to an embodiment. FIG. 15 is a view illustrating a camera module 300 according to the embodiment of FIG. 14, taken along direction A-A. FIG. 16 is a view illustrating a camera module 300 according to the embodiment of FIG. 14, taken along direction B-B.

Referring to FIGS. 14 to 16, the lens assembly 302 and/or the barrel assembly may be disposed in the space V surrounded by the second protruding guide portion 333 of the second carrier 330 of the carrier assembly, the second magnet 352*c*, the third magnet 353*c*, and the third carrier 340. The lens assembly 302 and/or the barrel assembly may be fixedly disposed together with the camera housing 301, and the carrier assembly including the image sensor 310 may move in the direction parallel to the optical axis D1 and/or the direction D2 and/or D3 crossing the optical axis, thereby performing an auto focus function and an optical image stabilization function. To that end, the camera module 300 may include a driving member 350 including at least one coil and at least one magnet. As described above, the driving member 350 may include a first driver 351 for an auto focus function, and a second driver and a third driver 353 for an optical image stabilization function.

The second coil 352*a* of the second driver 352 and the third coil 353*a* of the third driver 353 may be disposed at positions spaced 90 degrees apart from each other with respect to the center of the optical axis O-I. Corresponding thereto, the second magnet 352*c* of the second driver 352 and the third magnet 353*c* of the third driver 353 may also be disposed at positions spaced apart from each other by 90 degrees with respect to the optical axis O-I. In other words, the second driver 352 and the third driver 353 may be disposed at positions spaced apart from each other by 90 degrees with respect to the optical axis O-I. However, the first driver 351 may not be disposed at a position spaced apart from the second driver 352 and the third driver 353 by 90 degrees with respect to the optical axis O-I. For example, unlike in the drawings, the first driver 351 may be disposed at a position 45 degrees spaced apart from the second driver 352 and the third driver with respect to the center of the optical axis O-I, or such other an embodiment are also possible.

An electrical connection relationship between various components may be described. The first coil 351*a* may be electrically connected to the first PCB 311. In this case, the first coil 351*a* may be electrically connected to the first PCB 311 by a separate FPCB. The first PCB 311 may be electrically connected to the second PCB 313 using the first FPCB 312. The first coil 351*a* may be disposed on the first carrier 320 to move together during auto focus driving and/or optical image stabilization driving and, in this case, an electrical signal may be stably transmitted by the first FPCB 312. The second coil 352*a* and the third coil 353*a* may be electrically connected to the second PCB 313 through the second FPCB 360. Through this electrical connection relationship, an electronic device (e.g., the electronic device 101 of FIGS. 1 to 3) and/or a processor (e.g., the processor of FIG. 1) may input electrical signals for the first coil 351*a*, the second coil 352*a*, and the third coil 353*a*. The input of an electrical signal by an electronic device (e.g., the electronic device 101 of FIGS. 1 to 3) and/or the input of an electrical signal by a processor (e.g., the processor of FIG. 1) may be performed independently of each other.

Operations of each component may be described with reference to FIGS. 12 to 15. If a current is applied to the first coil 351*a* connected to the first PCB 311, an attractive force may be generated between the first magnet 351*c* and the first coil 351*a*, and the first protruding guide portion 323 of the first carrier 320 and the second protruding guide portion 333 of the second carrier 330 may approach each other by the attractive force. According to an embodiment, the first protruding guide portion 323 may be fitted into the fourth opening 335 of the second protruding guide portion 333 while being supported by the first guide ball 354. When the current applied to the first coil 351*a* changes, the first protruding guide portion 323 may reciprocate in the direction parallel to the optical axis D1 in the fourth opening 335 of the second protruding guide portion 333 due to a change in the magnetic field acting between the first magnet 351*c* and the first coil 351*a*. Through such an operation, the camera module 300 may implement an auto focus (AF) operation.

If a current is applied to the second coil 352*a* connected to the second FPCB 360, an attractive force may be generated between the second magnet 352*c* and the second coil 352*a*. If a current is applied to the third coil 353*a* connected to the second FPCB 360, an attractive force may be generated between the third magnet 353*c* and the third coil 353*a*. By these actions, the second carrier 330 may be sucked to the inner surface of the cover member 301*b* of the housing 301. The third carrier 340 may be disposed between the second carrier 330 and the cover member 301*b* of the housing 301, and the second guide ball 355 and the third guide ball 356 may be disposed in V-shaped grooves cut in two opposite surfaces of the third carrier 340 in directions perpendicular to each other. The third carrier 340 may be fitted between the second carrier 330 and the cover member 301*b* of the housing 301 while being supported by the second guide ball 355 and the third guide ball 356. According to an embodiment, if a V-shaped groove in the Y-axis direction is formed in the surface of the third carrier 340 facing in the +Z-axis, a V-shaped groove in the Y-axis direction corresponding thereto may also be formed in the inner surface of the cover member 301*b* of the housing 301. In this case, a V-shaped groove in the X-axis direction orthogonal to the Y-axis direction may be formed in the surface of the third carrier 340 facing in the −Z-axis and the surface of the second carrier 330 facing in the +Z-axis.

When the current applied to the second coil 352*a* is changed, the magnetic field acting between the second magnet 352*c* and the second coil 352*a* is changed, and because the position of the second coil 352*a* is fixed, the second carrier 330 where the second magnet 352*c* is disposed may reciprocate in one direction D2 perpendicular to the optical axis. In this case, the first protruding guide portion 323 of the first carrier 320 may be fitted into the second protruding guide portion 333 of the second carrier 330, and thus the movement of the second carrier 330 in one direction D2 perpendicular to the optical axis may lead to movement of the first carrier 320. In other words, the first PCB 311 where the first carrier 320 and the image sensor 310 are disposed may also reciprocate in one direction D2 perpendicular to the optical axis.

In addition to, or instead of the change in the current applied to the second coil 352*a*, the current applied to the third coil 353*a* may also be changed. When the current applied to the third coil 353*a* is changed, the magnetic field acting between the third magnet 353*c* and the third coil 353*a* is changed, and because the position of the third coil 353*a* is fixed, the second carrier 330 where the third magnet 353*c* is disposed may reciprocate in another direction D3 perpendicular to the optical axis. In this case, the first protruding guide portion 323 of the first carrier 320 may be fitted into the second protruding guide portion 333 of the second carrier 330, and thus the movement of the second carrier 330 in the other direction D3 perpendicular to the optical axis may lead to movement of the first carrier 320. In other words, the first PCB 311 where the first carrier 320 and the image sensor 310 are disposed may also reciprocate in the other direction D3 perpendicular to the optical axis.

The reciprocation in the D2 and D3 directions may be simultaneously performed by the third carrier 340 disposed between the second carrier 330 and the cover member 301*b* of the housing 301 and having guide grooves formed in two opposite surfaces in different directions. Through such an operation, the camera module 300 may implement an optical image stabilization (OIS) operation.

The above-described embodiments of FIGS. 4 to 16 represents an embodiment (the first embodiment) in which all of the coils and magnets included in the first driver 351, the second driver 352, and the third driver 353 are driven in a Lorentz type. The first driver 351, the second driver 352, and the third driver 353 driven in the Lorentz type may include a polarized magnet, and may be formed so that the driving direction of the magnet or coil is perpendicular to the direction of the magnet field formed between the magnet and the coil. According to the Lorentz type, driving force may be generated according to Fleming's left hand rule.

According to an embodiment, the camera module 300 to which an embodiment (the second embodiment) of driving in a solenoid type is applied may be provided.

Figure 17:
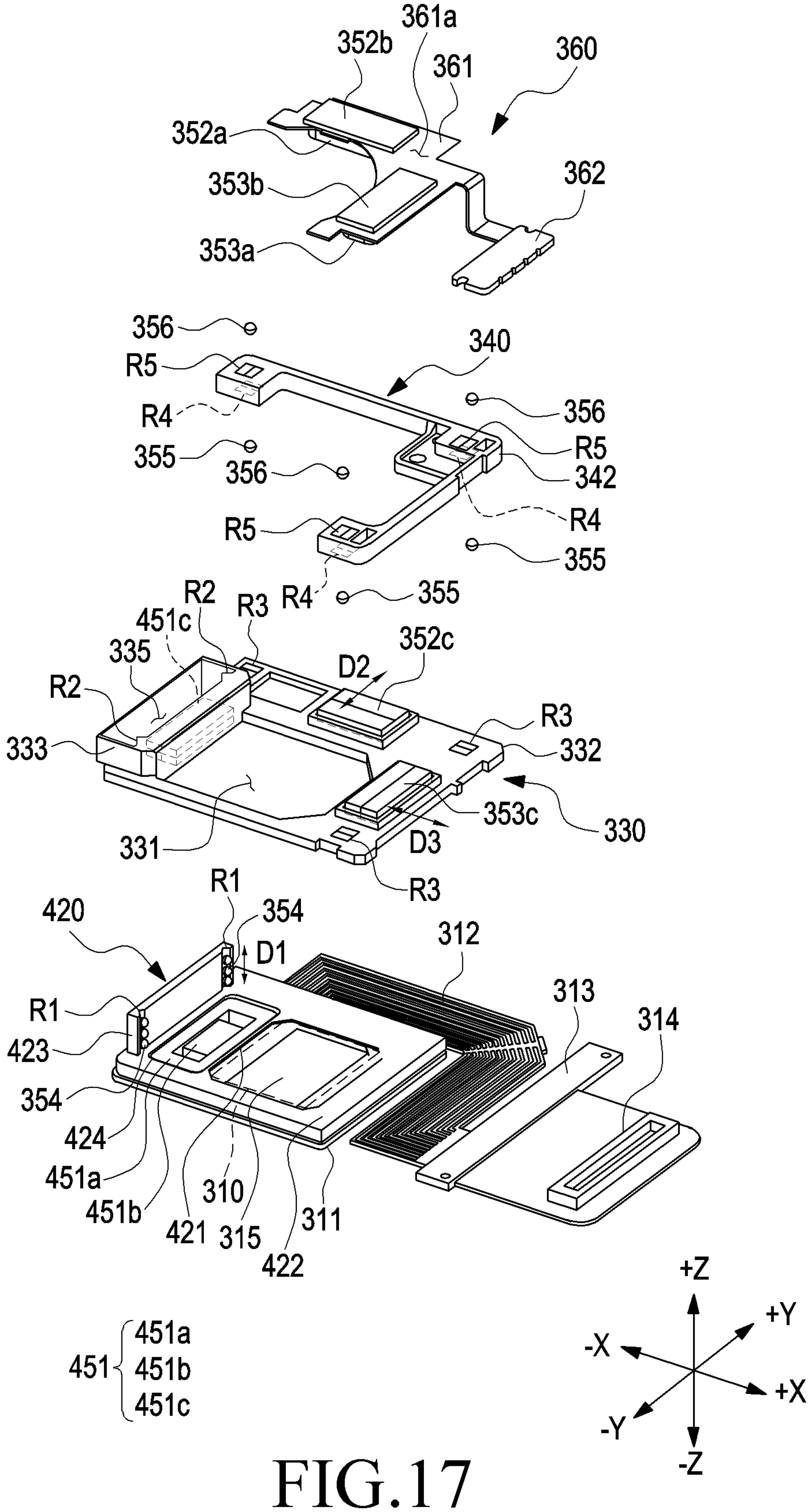
FIG. 17 is an exploded perspective view illustrating components received in a camera housing according to an embodiment different from that of FIG. 5.
Figure 18:
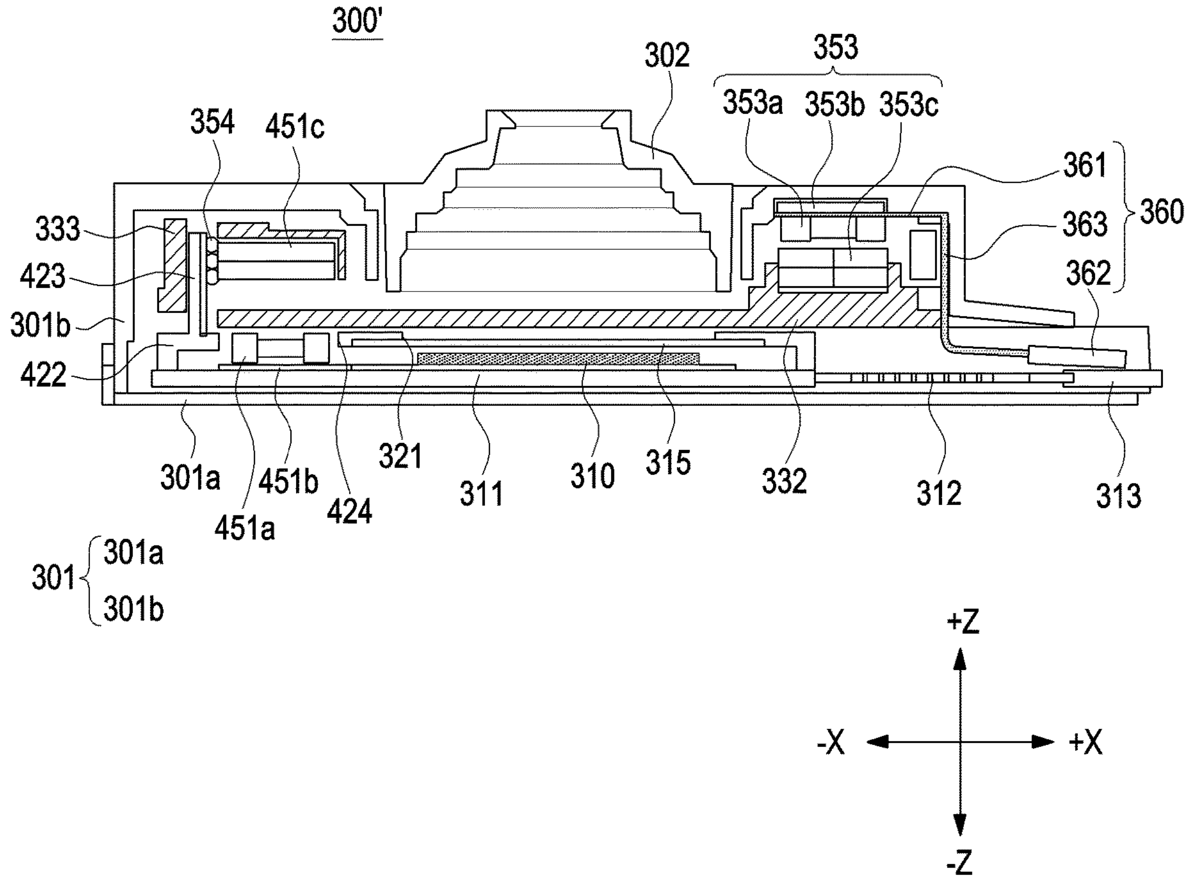
FIG. 18 is a cross-sectional view illustrating a camera module according to an embodiment different from that of FIG. 16.

FIGS. 17 and 18 are views illustrating a camera module 300' including a first driver 351 including a solenoid-type coil and a magnet according to an embodiment (second embodiment) different from the embodiment shown in FIGS. 4 to 16.

FIG. 17 is an exploded perspective view illustrating components received in a camera housing according to an embodiment different from that of FIG. 5. FIG. 18 is a cross-sectional view illustrating a camera module according to an embodiment different from that of FIG. 16.

In describing the camera module 300' of FIGS. 17 and 18, descriptions of the same components as those of the camera module 300 described above will be omitted.

According to an embodiment, the camera module 300' may include a first carrier 420, a second carrier 330, and a third carrier 340 as carrier members. Referring to FIG. 17, the first carrier 420 may include a first plate 422 coupled to the first PCB 311 and having a first opening 421 formed at a position overlapping the image sensor 310 and a second opening 424 formed side by side with the first opening 421 to receive a coil, and may include a first protruding guide portion 423 protruding from the first plate 422 in the direction parallel to the optical axis.

Unlike in the embodiment of FIG. 5 (the first embodiment) where the second opening 324 is formed in the first protruding guide portion 323, in the embodiment of FIG. 17 (the second embodiment), the second opening 424 may be formed in the first plate 422 rather than the first protruding guide portion 423. Like the first opening 421, the second opening 424 may be formed through a surface of the first plate 422 facing in the +Z-axis and a surface of the first plate 422 facing in the −Z-axis, and the first coil 451*a* may be received in the second opening 424. The first coil 451*a* received in the second opening 424 may form a magnetic field parallel to the optical axis, together with the first magnet 451*c* provided in the second protruding guide portion 333, and may reciprocate in the direction parallel to the optical axis D1 according to an electrical signal received by the first coil 451*a*.

FIGS. 17 and 18 illustrate an embodiment (the second embodiment) in which a coil and a magnet included in a first driver 451 are driven in a solenoid type. The first driver 451 driven in the solenoid type may be formed so that the driving direction of the magnet or coil is parallel to the direction of a magnet field formed between the magnet or coil without the need for the magnet to be polarized. According to the solenoid type, driving force may be generated according to Ampere's right hand thumb rule.

The an embodiment illustrated in FIGS. 17 and 18 illustrate a configuration in which only the coil and the magnet included in the first driver 451 are driven in the solenoid type, but according to an embodiment, the coil and the magnet included in the second driver 452 and/or the third driver 453 may also be driven in the solenoid type.

Figure 19:
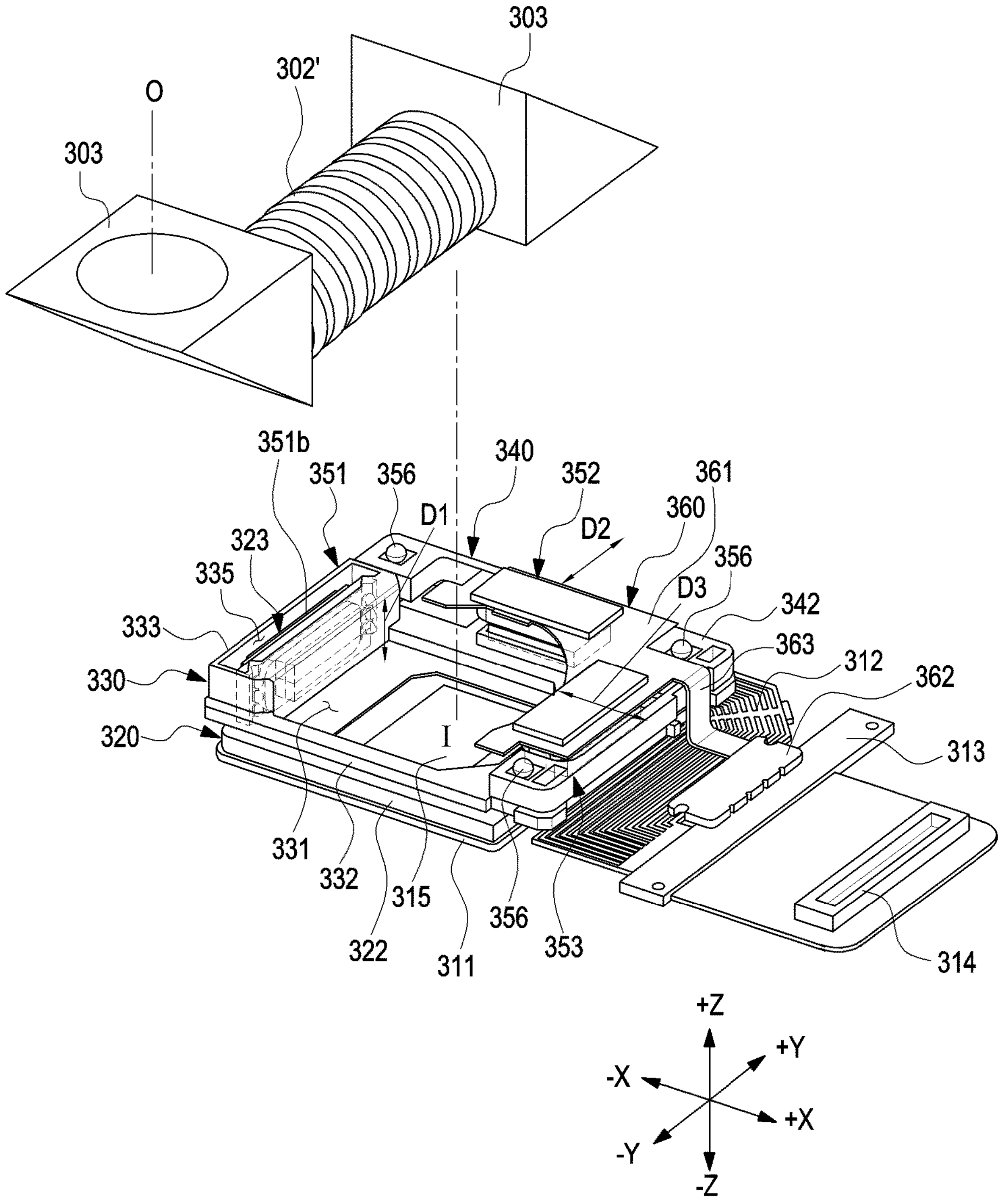
FIG. 19 is a view illustrating a camera module further including a member according to an embodiment.

FIG. 19 is a view illustrating a camera module further including a member 303 according to an embodiment.

According to an embodiment, the optical axis O-I may include a first optical axis and a second optical axis facing in a direction crossing the first optical axis.

According to an embodiment, the camera module may further include a member 303 at least partially received in the camera housing and configured to refract or reflect the first optical axis to the second optical axis and/or the second optical axis to the first optical axis. Here, the member 303 may include, e.g., a prism as a reflective member. Further, the member 303 may include at least one member, e.g., at least two members 303 as illustrated in FIG. 19. The member 303 may reflect or refract light incident from in a direction parallel to the first optical axis to a direction parallel to the second optical axis, and may guide or focus the light to the image sensor 310. In this case, the lens assembly 302' may be designed to include at least one lens aligned along the second optical axis.

The electronic device according to various embodiments may be one of various types of devices. The electronic devices may include, for example, a portable communication device (e.g., a smartphone), a computer device, a portable multimedia device, a portable medical device, a camera, a wearable device, or a home appliance. The electronic devices according to an embodiment are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there may be provided a camera module (e.g., the camera module 300 of FIG. 4, e.g., the camera module 300' of FIG. 18) including a camera housing (e.g., the camera housing 301 of FIG. 4), at least one lens aligned along an optical axis (e.g., the optical axis O-I of FIG. 4), at least partially received in the camera housing, a first PCB (e.g., the first PCB 311 of FIG. 4) including an image sensor (e.g., the image sensor 310 of FIG. 4) disposed on a surface thereof, a carrier member configured to guide the first PCB in a direction parallel to the optical axis and a direction crossing the optical axis, and a driving member (e.g., the driving member 350 of FIG. 4) including at least one coil and at least one magnet disposed to at least partially face the at least one coil, and configured to move the carrier member in the direction of the optical axis and the direction crossing the optical axis due to a ball bearing rotation.

According to an embodiment (e.g., the first embodiment), the carrier member may include a first carrier (e.g., the first carrier 320 of FIG. 4) coupled with the first PCB, including a first opening (e.g., the first opening 321 of FIG. 4) formed at a position overlapping the image sensor and a first plate (e.g., the first plate 322 of FIG. 4) at least partially surrounding the first opening, and including a first protruding guide portion (e.g., the first protruding guide portion 323 of FIG. 4) protruding from the first plate in the direction parallel to the optical axis and including a second opening (e.g., the second opening 324 of FIG. 4) for receiving a coil, a second carrier (e.g., the second carrier 330 of FIG. 4) disposed on the first carrier, including a third opening (e.g., the third opening 331 of FIG. 4) formed at a position overlapping the image sensor and a second plate (e.g., the second plate 332 of FIG. 4) at least partially surrounding the third opening, and including a second protruding guide portion (e.g., the second protruding guide portion 333 of FIG. 4) protruding from the second plate in the direction parallel to the optical axis and including a fourth opening (e.g., the fourth opening 335 of FIG. 4) for receiving the first protruding guide portion; and a third carrier (e.g., the third carrier 340 of FIG. 4) disposed on the second carrier.

According to an embodiment, the driving member may include a first driver (e.g., the first driver 351 of FIG. 4) including a first coil (e.g., the first coil 351*a* of FIG. 4) which is a coil received in the second opening of the first protruding guide portion and a first magnet (e.g., the first magnet 351*c* of FIG. 4) disposed at a position corresponding to the first coil to face the first coil in the second protruding guide portion.

In this case, the first driver may be a driver for autofocusing of the camera module.

The camera module according to an embodiment may further include a first guide ball (e.g., the first guide ball 354 of FIG. 4) positioned between an outer surface of the first protruding guide portion and an inner surface of the second protruding guide portion when the first protruding guide portion is received in the second protruding guide portion. The first driver may reciprocate the first carrier in the direction parallel to the optical axis due to the ball bearing rotation by using the first guide ball.

According to an embodiment, a first recess (e.g., the first recess R1 of FIG. 4) where the first guide ball is seated may be formed in the outer surface of the first protruding guide portion. A second recess (e.g., the second recess R2 of FIG. 5) where the first guide ball is seated may be formed in the inner surface of the second protruding guide portion facing the outer surface of the first protruding guide portion.

According to an embodiment, the driving member may include a second driver (e.g., the second driver 352 of FIG. 4) including a second coil (e.g., the second coil 352*a* of FIG. 4) fixedly disposed on a cover member of the camera housing and a second magnet (e.g., the second magnet 352*c* of FIG. 4) disposed at a position corresponding to the second coil to face the second coil on one surface of the second carrier and a third driver (e.g., the third driver 353 of FIG. 4) including a third coil (e.g., the third coil 353*a* of FIG. 4) fixedly disposed on the cover member of the camera housing and a third magnet (e.g., the third magnet 353*c* of FIG. 4) disposed at a position corresponding to the third coil to face the third coil on the one surface of the second carrier.

In this case, the second driver and the third driver may be drivers for image stabilization of the camera module.

According to an embodiment, the camera module may further include a second guide ball (e.g., the second guide ball 355 of FIG. 4) disposed between the second carrier and the third carrier and a third guide ball (e.g., the third guide ball 356 of FIG. 4) disposed between the third carrier and the cover member of the camera housing. The second driver and the third driver may reciprocate the first carrier in the direction crossing the optical axis due to the ball bearing rotation by using the second guide ball and the third guide ball.

According to an embodiment, a third recess (e.g., the third recess R3 of FIG. 4) where the second guide ball is seated may be formed in a surface of the second carrier facing the third carrier.

According to an embodiment, a fourth recess (e.g., the fourth recess R4 of FIG. 4) where the second guide ball is seated may be formed in a surface of the third carrier facing the second carrier, and a fifth recess (e.g., the fifth recess R5 of FIG. 4) where the third guide ball is seated may be formed in a surface of the third carrier facing the cover member of the housing.

According to an embodiment, the first PCB may be electrically connected to a second PCB where at least one connector is disposed, using a first FPCB. The first FPCB may include a first end portion (e.g., the first end portion 312*a* of FIG. 6) coupled to the first PCB, a second end portion (e.g., the second end portion 312*d* of FIG. 6) coupled to the second PCB, and an extension (e.g., the extension 312*b* or 312*c* of FIG. 6) extending from the first end portion to be connected to the second end portion.

According to an embodiment, the second coil and the third coil may be electrically connected to a second FPCB (e.g., the second FPCB 360 of FIG. 4) fixedly disposed on the cover member of the housing.

According to an embodiment (e.g., the second embodiment), the carrier member may include a first carrier (e.g., the first carrier 420 of FIG. 17) coupled with the first PCB, including a first plate (e.g., the first plate 422 of FIG. 17) including a first opening (e.g., the first opening 421 of FIG. 17) formed at a position overlapping the image sensor and a second opening (e.g., the second opening 424 of FIG. 17) formed side by side with the first opening to receive a coil, and including a first protruding guide portion (e.g., the first protruding guide portion 423 of FIG. 17) protruding from the first plate in the direction parallel to the optical axis, a second carrier (e.g., the second carrier 330 of FIG. 17) disposed on the first carrier, including a third opening formed at a position overlapping the image sensor and a second plate at least partially surrounding the third opening, and including a second protruding guide portion protruding from the second plate in the direction parallel to the optical axis and having a fourth opening for receiving the first protruding guide portion, and a third carrier (e.g., the third carrier 340 of FIG. 17) disposed on the second carrier.

In the camera module according to an embodiment, the optical axis may include a first optical axis and a second optical axis facing in a direction crossing the first optical axis. The camera module may further include a member (e.g., the member 303 of FIG. 19) at least partially received in the camera housing and configured to refract or reflect the first optical axis to the second optical axis or the second optical axis to the first optical axis.

According to an embodiment, there may be provided an electronic device (e.g., the electronic device 101 of FIGS. 1 to 3) including a housing (e.g., the housing 210 of FIG. 2) and a camera module (e.g., the camera module 300 of FIG. 4) at least partially received in the housing, wherein the camera module includes a camera housing (e.g., the camera housing 301 of FIG. 4), at least one lens aligned along an optical axis, and an image sensor (e.g., the image sensor 310 of FIG. 4) configured to form light passing through the at least one lens to output as a digital signal, and includes an auto-focusing driver configured to move the image sensor in a direction parallel to the optical axis due to a ball bearing member and an optical image stabilization driver configured to move the image sensor in at least one direction crossing the optical axis due to the ball bearing rotation.

According to an embodiment, the auto focus driver may include a first carrier (e.g., the first carrier 320 of FIG. 4), a first magnet (e.g., the first magnet 351*c* of FIG. 4), and a first coil (e.g., the first coil 351*a* of FIG. 4). The first carrier may be coupled with a first PCB (e.g., the first PCB 311 of FIG. 4) where the image sensor is disposed and may include a first protruding guide portion (e.g., the first protruding guide portion 323 of FIG. 4) for guiding the first carrier in the optical axis direction.

The electronic device (or processor) according to an embodiment may adjust the focus of the image obtained from the image sensor based on interactions between the first protruding guide portion and the first guide ball disposed on at least one surface of the first protruding guide portion to roll in the optical axis direction, by an electromagnetic force generated as current is applied to the first coil.

According to an embodiment, the optical image stabilization driver may include a second carrier (e.g., the second carrier 330 of FIG. 4), a second magnet (e.g., the second magnet 352*c* of FIG. 4), and a second coil (e.g., the second coil 352*a* of FIG. 4) and include a third carrier (e.g., the third carrier 340 of FIG. 4), a third magnet (e.g., the third magnet 353*c* of FIG. 4), and a third coil (e.g., the third coil 353*a* of FIG. 4), and the second carrier may include a second protruding guide portion (e.g., the second protruding guide portion 333 of FIG. 4) including an opening (e.g., the second opening 324 of FIG. 4) for receiving the first protruding guide portion.

The electronic device (or processor) according to an embodiment may adjust the focus of the image obtained from the image sensor based on interactions between the first protruding guide portion and the first guide ball disposed on at least one surface of the first protruding guide portion to roll in the optical axis direction, by an electromagnetic force generated as current is applied to the second coil.

According to an embodiment, there may be provided an electronic device (e.g., the electronic device 101 of FIGS. 1 to 3) including a camera module (e.g., the camera module 300 of FIG. 4, e.g., the camera module 300' of FIG. 3), including a housing, at least one optical member aligned along an optical axis, a first PCB (e.g., the first PCB 311 of FIG. 4) including an image sensor (e.g., the image sensor 310 of FIG. 4) disposed on a surface thereof, a carrier member configured to guide the first PCB in a direction parallel to the optical axis and a direction crossing the optical axis, and a driving member (e.g., the driving member 350 of FIG. 4) including at least one coil and at least one magnet disposed to at least partially face the at least one coil and a plurality of guide balls, and configured to move the carrier member in the direction parallel to the optical axis and the direction crossing the optical axis due to a ball bearing rotation.

According to an embodiment, the at least one optical member may include at least one of a lens, a prism, and/or a mirror.

While certain embodiments of the disclosure have been described and shown, it should be appreciated that these embodiments are not intended as limiting the disclosure but as illustrative. It will be apparent to one of ordinary skill in the art that various changes may be made in form and detail without departing from the overall scope of the disclosure, including the appended claims and their equivalents.

What is claimed is:

1. A camera module comprising:
- a camera housing;
- at least one lens aligned along an optical axis;
- a first printed circuit board (PCB) comprising an image sensor disposed on a surface of the first PCB;
- a carrier member configured to guide the first PCB in each of three orthogonal directions, comprising a first orthogonal direction parallel to the optical axis, a second orthogonal direction crossing the optical axis, and a third orthogonal direction crossing the first orthogonal direction and the second orthogonal direction,
- a second PCB;
- at least one connector on the second PCB; and
- a first flexible PCB (FPCB) electrically connecting the first PCB to the second PCB,
- wherein the first FPCB comprises:
  - a first end portion coupled to the first PCB;
  - a second end portion coupled to the second PCB; and
  - an extension extending from the first end portion and connected to the second end portion,
- wherein the carrier member comprises:
  - a first carrier member configured to guide the first PCB in the first orthogonal direction;
  - a second carrier member configured to guide the first PCB in the second orthogonal direction; and
  - a third carrier member configured to guide the first PCB in the third orthogonal direction; and
- a driving member comprising:
  - a plurality of guide balls;
  - a first driver configured to move the first carrier member in the first orthogonal direction using at least one of the plurality of guide balls;
  - a second driver configured to move the second carrier member in the second orthogonal direction using at least one of the plurality of guide balls; and
  - a third driver configured to move the third carrier member in the third orthogonal direction using at least one of the plurality of guide balls.

2. The camera module of claim 1, wherein the first carrier member is coupled with the first PCB and comprises:
- a first plate comprising a first opening formed at a position overlapped with the image sensor when viewed in the first orthogonal direction; and
- a first protruding guide portion protruded from the first plate in the first orthogonal direction and comprising a second opening for receiving a coil
- wherein the second carrier member is disposed on the first carrier member, and comprises:
- a second plate comprising a third opening formed at a position overlapped with the image sensor when viewed in the first orthogonal direction; and a second protruding guide portion protruded from the second plate in the first orthogonal direction and comprising a fourth opening for receiving the first protruding guide portion; and wherein the third carrier member is disposed on the second carrier member.

3. The camera module of claim 2, wherein the first driver comprises:

a first coil received in the second opening of the first protruding guide portion; and a first magnet disposed at a position in the second protruding guide portion corresponding to the first coil.

4. The camera module of claim 1, wherein the first driver is configured to auto-focus the camera module.

5. The camera module of claim 2, wherein the plurality of guide balls comprises:

a first guide ball, and wherein the first driver is configured to reciprocate the first carrier member in the first orthogonal direction based on a rotation of the first guide ball.

6. The camera module of claim 5, wherein a first recess where the first guide ball is seated is formed in an outer surface of the first protruding guide portion, and wherein a second recess where the first guide ball is seated is formed in an inner surface of the second protruding guide portion facing the outer surface of the first protruding guide portion.

7. The camera module of claim 1, wherein the second driver comprises a second coil fixedly disposed in the camera housing and a second magnet at a position on a surface of the second carrier member corresponding to the second coil; and wherein the third driver comprises a third coil fixedly disposed in the camera housing and a third magnet at a position on the surface of the second carrier member corresponding to the third coil.

8. The camera module of claim 7, wherein each of the second driver and the third driver is configured for optical image stabilization of the camera module.

9. The camera module of claim 5, wherein the plurality of guide balls further comprises:

a second guide ball; and a third guide ball, wherein the second driver is configured to reciprocate the second carrier member in the second orthogonal direction based on a ball bearing manner by using the second guide ball, and wherein the third driver is configured to reciprocate the third carrier member in the third orthogonal direction based on the ball bearing manner by using the third guide ball.

10. The camera module of claim 9, wherein the second guide ball is at least partially accommodated in a third recess formed in a third surface of at least one portion of the second carrier member facing at least one portion of the third carrier member.

11. The camera module of claim 9, wherein a fourth recess where the second guide ball is seated is formed in a surface of the third carrier member facing the second carrier member, and wherein a fifth recess where the third guide ball is seated is formed in a surface opposite to the surface where the second guide ball is seated of the third carrier member.

12. The camera module of claim 1, wherein the at least one lens is fixedly disposed in the camera housing, and wherein the carrier member is configured to guide the first PCB, on which the image sensor is disposed, in each of three orthogonal directions.

13. The camera module of claim 7, further comprising a second FPCB disposed on a cover member of the camera housing, wherein the second coil and the third coil are electrically connected to the second FPCB.

14. The camera module of claim 1, wherein the first carrier member is coupled with the first PCB and comprises:

a first plate comprising a first opening formed at a position overlapped with the image sensor and a second opening formed adjacent to the first opening and configured to receive a coil; and a first protruding guide portion protruded from the first plate in the first orthogonal direction, wherein the second carrier member is disposed on the first carrier member, the second carrier member comprises:

a second plate comprising a third opening formed at a position overlapped with the image sensor; and a second protruding guide portion protruding from the second plate in the first orthogonal direction and comprising a fourth opening for receiving the first protruding guide portion, and wherein the third carrier member is disposed on the second carrier member.

15. The camera module of claim 1, wherein the optical axis comprises a first optical axis and a second optical axis facing the third orthogonal direction crossing the first optical axis, wherein the camera module further comprises a member configured to refract or reflect a light based on the first optical axis to a light based on the second optical axis.

16. An electronic device comprising:

a camera module comprising:

a camera housing;

at least one lens aligned along an optical axis;

a first printed circuit board (PCB) comprising an image sensor configured to form light transmitted through the at least one lens to output as a digital signal;

a carrier member configured to guide the first PCB in each of three orthogonal directions, comprising a first orthogonal direction parallel to the optical axis, a second orthogonal direction crossing the optical axis, and a third orthogonal direction crossing the first and second orthogonal directions, wherein the carrier member comprises:

a second PCB;

at least one connector on the second PCB; and a first flexible PCB (FPCB) electrically connecting the first PCB is electrically connected to the second PCB, wherein the first FPCB comprises:

a first end portion coupled to the first PCB;

a second end portion coupled to the second PCB; and an extension extending from the first end portion and connected to the second end portion, a first carrier member configured to guide the first PCB in the first orthogonal direction;

a second carrier member configured to guide the first PCB in the second orthogonal direction; and a third carrier member configured to guide the first PCB in the third orthogonal direction; and a driving member comprising:

a plurality of guide balls;

an auto-focusing driver configured to move the carrier member in the first orthogonal direction using at least one of the plurality of guide balls; and first and second optical image stabilization drivers configured to move the carrier member in the second orthogonal direction and the third orthogonal direction using at least one of the plurality of guide balls.

17. The electronic device of claim 16, wherein the auto-focusing driver further includes a first magnet and a first coil, wherein the first carrier member is coupled with a first PCB where the image sensor is disposed, and includes a first protruding guide portion for guiding the first carrier member in the first orthogonal direction, and wherein the electronic device is configured to adjust the focus of the image based on interactions between the first protruding guide portion and a first guide ball disposed on at least one surface of the first protruding guide portion to roll in the first orthogonal direction, by an electromagnetic force generated as current is applied to the first coil.

18. The electronic device of claim 17, wherein the first optical image stabilization driver further includes a second magnet and a second coil, and the second optical image stabilization driver further includes a third magnet, and a third coil, wherein the first optical image stabilization driver is configured to reciprocate the second carrier member in the second orthogonal direction based on a ball bearing manner by using a second guide ball, wherein the second optical image stabilization driver is configured to reciprocate the third carrier member in the third orthogonal direction based on the ball bearing manner by using a third guide ball, and wherein the electronic device is configured to adjust the image stabilization of the image sensor by an electromagnetic force generated as current is applied to the second coil and/or the third coil.

19. An electronic device comprising:

a housing; and a camera module disposed in the housing;

wherein the camera module comprises:

a camera housing;

at least one optical member aligned along an optical axis;

a first printed circuit board (PCB) comprising an image sensor disposed on a surface of the first PCB;

a carrier member configured to guide the first PCB in each of three orthogonal directions, comprising a first orthogonal direction parallel to the optical axis, a second orthogonal direction crossing the optical axis, and a third orthogonal direction crossing the first and second orthogonal directions, a second PCB;

at least one connector on the second PCB; and a first flexible PCB (FPCB) electrically connecting the first PCB is electrically connected to the second PCB, wherein the first FPCB comprises:

a first end portion coupled to the first PCB;

a second end portion coupled to the second PCB; and an extension extending from the first end portion and connected to the second end portion, wherein the carrier member comprises:

a first carrier member configured to guide the first PCB, on which the image sensor is disposed, in the first orthogonal direction;

a second carrier member configured to guide the first PCB, on which the image sensor is disposed, in the second orthogonal direction; and a third carrier member configured to guide the first PCB, on which the image sensor is disposed, in the third orthogonal direction; and a driving member comprising:

a plurality of guide balls;

an auto-focusing driver configured to move the first carrier member in the first orthogonal direction using at least one of the plurality of guide balls; and first and second optical image stabilization drivers configured to move the second carrier member in the second orthogonal direction and the third orthogonal direction, respectively, using at least one of the plurality of guide balls.

20. The electronic device of claim 19, wherein the at least one optical member includes at least one of a lens, a prism, and/or a mirror.

* * * * *